US009440657B1

(12) United States Patent
Fields et al.

(10) Patent No.: US 9,440,657 B1
(45) Date of Patent: Sep. 13, 2016

(54) ADVANCED VEHICLE OPERATOR INTELLIGENCE SYSTEM

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US); Aaron Scott Chan, Lisle, IL (US); Kenneth Jason Sanchez, Bloomington, IL (US); Matthew Christopher Jon Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/857,242

(22) Filed: Sep. 17, 2015

Related U.S. Application Data

(63) Continuation of application No. 14/729,290, filed on Jun. 3, 2015, now Pat. No. 9,205,842, which is a continuation of application No. 14/255,934, filed on Apr. 17, 2014, now Pat. No. 9,135,803, application No. 14/857,242, which is a continuation of application No. 14/255,934, filed on Apr. 17, 2014, now Pat. No. 9,135,803.

(51) Int. Cl.
  *G08B 21/06* (2006.01)
  *B60W 40/08* (2012.01)
  (Continued)

(52) U.S. Cl.
  CPC .............. *B60W 40/08* (2013.01); *B60K 28/06* (2013.01); *B60K 28/066* (2013.01); *G08B 21/02* (2013.01); *G08B 21/06* (2013.01); *B60W 2040/0818* (2013.01)

(58) Field of Classification Search
  CPC ...... G08B 21/06; G08B 21/02; B60K 28/06; B60K 28/066
  See application file for complete search history.

(56) References Cited

U.S. PATENT DOCUMENTS

| 5,368,484 A | 11/1994 | Copperman et al. |
| 5,488,353 A * | 1/1996 | Kawakami ............. G08B 21/06 340/575 |

(Continued)

OTHER PUBLICATIONS

Chan et al., The emotional side of cognitive distraction: implications for road safety, Accident Analysis and Prevention, 50:147-54 (2013).

(Continued)

*Primary Examiner* — Andrew Bee
(74) *Attorney, Agent, or Firm* — Marshall, Gerstein & Borun LLP; Randall G. Rueth

(57) ABSTRACT

The method, system, and computer-readable medium cause the monitoring of a vehicle operator during the course of vehicle operation to determine whether the vehicle operator is impaired and causes a mitigating response when an impairment is determined to exist. The vehicle operator, the environment surrounding the vehicle, or forces acting on the vehicle may be monitored using a variety of sensors, including optical sensors, accelerometers, or biometric sensors (e.g., skin conductivity, heart rate, or voice modulation). When the vehicle operator is determined to be impaired, an alert or other mitigating response is implemented, based on the sensor data. In some embodiments, mitigating actions may be taken to avoid vehicle operator impairment. In further embodiments, a training period may be used to generate a profile for the vehicle operator.

18 Claims, 10 Drawing Sheets

(51) Int. Cl.
*G08B 21/02* (2006.01)
*B60K 28/06* (2006.01)

(56) References Cited

U.S. PATENT DOCUMENTS

| | | |
|---|---|---|
| 5,499,182 A | 3/1996 | Ousborne |
| 5,515,026 A | 5/1996 | Ewert |
| 5,574,641 A * | 11/1996 | Kawakami ............ G08B 21/06 180/272 |
| 5,626,362 A | 5/1997 | Mottola |
| 5,835,008 A | 11/1998 | Colemere, Jr. |
| 6,253,129 B1 | 6/2001 | Jenkins et al. |
| 6,313,749 B1 | 11/2001 | Horne et al. |
| 6,473,000 B1 | 10/2002 | Secreet et al. |
| 6,477,117 B1 | 11/2002 | Narayanaswami et al. |
| 6,556,905 B1 | 4/2003 | Mittelsteadt et al. |
| 6,661,345 B1 | 12/2003 | Bevan et al. |
| 6,704,434 B1 | 3/2004 | Sakoh et al. |
| 6,909,947 B2 | 6/2005 | Douros et al. |
| 7,027,621 B1 | 4/2006 | Prokoski |
| 7,054,723 B2 | 5/2006 | Seto et al. |
| 7,138,922 B2 | 11/2006 | Strumolo et al. |
| 7,149,533 B2 | 12/2006 | Laird et al. |
| 7,253,724 B2 | 8/2007 | Prakah-Asante et al. |
| 7,302,344 B2 | 11/2007 | Olney et al. |
| 7,356,392 B2 | 4/2008 | Hubbard et al. |
| 7,424,414 B2 | 9/2008 | Craft |
| 7,609,150 B2 | 10/2009 | Wheatley et al. |
| 7,639,148 B2 | 12/2009 | Victor |
| 7,692,552 B2 | 4/2010 | Harrington et al. |
| 7,719,431 B2 | 5/2010 | Bolourchi |
| 7,835,834 B2 | 11/2010 | Smith et al. |
| 8,009,051 B2 | 8/2011 | Omi |
| 8,010,283 B2 | 8/2011 | Yoshida et al. |
| 8,185,380 B2 | 5/2012 | Kameyama |
| 8,554,468 B1 | 10/2013 | Bullock |
| 8,595,034 B2 | 11/2013 | Bauer et al. |
| 8,738,523 B1 | 5/2014 | Sanchez et al. |
| 9,135,803 B1 | 9/2015 | Fields et al. |
| 9,205,842 B1 | 12/2015 | Fields et al. |
| 2004/0017106 A1 | 1/2004 | Aizawa et al. |
| 2004/0054452 A1 | 3/2004 | Bjorkman |
| 2004/0090334 A1 | 5/2004 | Zhang et al. |
| 2005/0131597 A1 | 6/2005 | Raz et al. |
| 2006/0052909 A1 | 3/2006 | Cherouny |
| 2006/0232430 A1 | 10/2006 | Takaoka et al. |
| 2007/0001831 A1 | 1/2007 | Raz et al. |
| 2007/0080816 A1 | 4/2007 | Haque et al. |
| 2007/0122771 A1 | 5/2007 | Maeda et al. |
| 2007/0159344 A1 | 7/2007 | Kisacanin |
| 2008/0204256 A1 * | 8/2008 | Omi ....................... G08B 21/06 340/575 |
| 2008/0291008 A1 | 11/2008 | Jeon |
| 2009/0063030 A1 | 3/2009 | Howarter et al. |
| 2010/0055649 A1 | 3/2010 | Takahashi et al. |
| 2010/0131304 A1 | 5/2010 | Collopy et al. |
| 2010/0214087 A1 | 8/2010 | Nakagoshi et al. |
| 2011/0090075 A1 | 4/2011 | Armitage et al. |
| 2011/0106370 A1 | 5/2011 | Duddle et al. |
| 2011/0304465 A1 | 12/2011 | Boult et al. |
| 2011/0307188 A1 | 12/2011 | Peng et al. |
| 2012/0025969 A1 | 2/2012 | Dozza |
| 2012/0083974 A1 * | 4/2012 | Sandblom ................ A61B 5/18 701/45 |
| 2012/0191343 A1 | 7/2012 | Haleem |
| 2012/0215375 A1 | 8/2012 | Chang |
| 2012/0316406 A1 | 12/2012 | Rahman et al. |
| 2013/0006675 A1 | 1/2013 | Bowne et al. |
| 2013/0038437 A1 | 2/2013 | Talati et al. |
| 2013/0073115 A1 | 3/2013 | Levin et al. |
| 2013/0144459 A1 | 6/2013 | Ricci |
| 2013/0164715 A1 | 6/2013 | Hunt et al. |
| 2013/0189649 A1 | 7/2013 | Mannino |
| 2013/0209968 A1 | 8/2013 | Miller et al. |
| 2014/0047347 A1 | 2/2014 | Mohn et al. |
| 2014/0059066 A1 | 2/2014 | Koloskov |
| 2014/0099607 A1 | 4/2014 | Armitage et al. |
| 2014/0108198 A1 | 4/2014 | Jariyasunant et al. |
| 2014/0125474 A1 | 5/2014 | Gunaratne |
| 2014/0167967 A1 | 6/2014 | He et al. |
| 2014/0168399 A1 | 6/2014 | Plummer et al. |
| 2014/0172467 A1 | 6/2014 | He et al. |
| 2014/0218187 A1 | 8/2014 | Chun et al. |
| 2014/0240132 A1 | 8/2014 | Bychkov |
| 2014/0278569 A1 | 9/2014 | Sanchez et al. |
| 2015/0051752 A1 | 2/2015 | Paszkowicz |

OTHER PUBLICATIONS

Hancock, G.M., P.A. Hancock, and C.M. Janelle, "The Impact of Emotions and Predominant Emotion Regulation Technique on Driving Performance," pp. 5882-5885, 2012.

Laine et al., Behavioral triggers of skin conductance responses and their neural correlates in the primate amygdala, J. Neurophysiol., 101:1749-54 (2009).

Lee et al., What is stressful on the road? Analysis on aggression-inducing traffic situations through self-report, Proceedings of the Human Factors and Ergonomics Society Annual Meeting, 57(1):1500-1503 (Sep. 2013).

McCraty, R., B. Barrios-Choplin, M. Atkinson, and D. Tomasino. "The Effects of Different Types of Music on Mood, Tension, and Mental Clarity." Alternative Therapies in Health and Medicine 4.1 (1998): 75-84. NCBI PubMed. Web. Jul. 11, 2013.

Nasoz et al., Emotion recognition from physiological signals using wireless sensors for presence technologies, Cogn. Tech. Work, 6:4-14 (2004).

Nass et al., Improving automotive safety by pairing driver emotion and car voice emotion. CHI 2005 Late Breaking Results: Short Papers, Portland, Oregon (Apr. 2-7, 2005).

Office Action dated Dec. 19, 2014 for U.S. Appl. No. 14/511,750, 18 pgs.

Office Action of Dec. 26, 2014 for U.S. Appl. No. 14/511,712, 21 pgs.

Wiesenthal, David L., Dwight A. Hennessy, and Brad Totten, "The Influence of Music on Driver Stress," Journal of Applied Social Psychology 30, 8, pp. 1709-1719, 2000.

\* cited by examiner

ADVANCED VEHICLE OPERATOR INTELLIGENCE SYSTEM

CROSS-REFERENCE TO RELATED APPLICATIONS

This application is a continuation of U.S. patent application Ser. No. 14/729,290, entitled "Advanced Vehicle Operator Intelligence System," filed Jun. 3, 2015, which is a continuation of U.S. patent application Ser. No. 14/255,934, entitled "Advanced Vehicle Operator Intelligence System," filed Apr. 17, 2014, (issued as U.S. Pat. No. 9,135,803 on Sep. 15, 2015), which are hereby incorporated herein by reference in its entirety.

TECHNICAL FIELD

The present disclosure generally relates to a system and a method for determining when a vehicle operator is impaired using multiple types of sensor data and implementing a response to mitigate vehicle operator impairment.

BACKGROUND

Every year many vehicle accidents are caused by impaired vehicle operators. One common kind of impaired vehicle operation is drowsy driving. If the vehicle operator falls asleep for even a second while driving, the results can be disastrous. Another common kind of impaired vehicle operation is distracted driving. Modern motor vehicles come equipped with any number of distractions including stereos, air-conditioners, navigation systems, etc. Furthermore, a vehicle operator can be distracted by another passenger or by articles the vehicle operator brings into the vehicle (e.g., a mobile telephone, book, etc.). Yet another common kind of impaired vehicle operation is agitated, anxious, or aggressive driving. Numerous incidents occurring during the course of a trip may aggravate the vehicle operator, such as traffic jams, poor driving by other drivers, vehicle malfunctions, or inclement weather conditions. Additionally, factors unrelated to the trip may distract or aggravate the vehicle operator, such as receipt of bad news, running behind schedule, passenger conduct, or any number of factors occurring prior to vehicle operation. These and other factors may impair the ability of vehicle operators to operate vehicles safely.

Many modern vehicles are equipped with a variety of devices that may be used to monitor vehicle operator impairment, including on-board computing systems, accelerometers, cameras, and Global Positioning System (GPS) units. In addition, many mobile devices such as smartphones contain a variety of sensors and are capable of wireless communication of data.

SUMMARY

The present invention discloses a method, system, and computer-readable medium storing instructions for determining and mitigating vehicle operator impairment. One embodiment consists of a computer-implemented method including receiving data about the vehicle operator, vehicle operation, and vehicle environment from one or more sensors, processing the sensor data to determine whether the vehicle operator is impaired, determining one or more responses to alert the vehicle operator or mitigate the impairment, and cause the responses to be implemented. The sensors may include any device capable of providing sensor data regarding the vehicle operator, vehicle motion, or the vehicle's environment. In addition to other information, the sensors may be used to monitor the following physiological data regarding the vehicle operator: heart rate, heart rate variability data, grip pressure, electrodermal activity data, telematics driving score, body temperature, arm movement, head movement, vocal amplitude, vocal frequency, vocal pattern, gaze direction, gaze duration, head direction, eyelid opening, blink rate, pupillometry data, blood pressure, electroencephalographic data, respiration rate, respiration pattern, galvanic skin response, functional near infrared optical brain imaging data, functional magnetic resonance imaging data, and electromyographic data. The sensors may also be used to monitor the following data: a vehicle operator head nod, a vehicle operator scanning frequency, a vehicle operator gaze fixation, a vehicle operator mirror checking, a vehicle operator head rotation, a vehicle operator arm movement, a vehicle lane deviation, a vehicle swerving, a vehicle lane centering, a vehicle acceleration along a single axis or multiple axes, a vehicle distance to other objects, or a measure of vehicle time to collision with other objects. Additional sensor data from sensors currently existing or later developed may also be used. Data may also be received through a network, such as a cellular data network or a satellite communication network, including the following: a position of the vehicle, movement of the vehicle, an external environment around the vehicle, or traffic conditions.

In some embodiments, the sensors may be communicatively connected to a mobile device, such as a smart phone, or to an on-board computer. The mobile device or on-board computer may receive sensor data, process the sensor data to determine whether the vehicle operator is impaired, determine one or more responses to alert the vehicle operator or mitigate the impairment when one is determined to exist, and cause the responses to be implemented. The determination of whether the vehicle operator is impaired may involve calculating impairment scores using the sensor data (e.g., a pulse rate score, a pupil dilation score, a hard braking score, a lane centering score, a time to collision score, etc.), then calculating one or more total impairment scores using the impairment scores (e.g., a total drowsiness score, a total anxiety score, a total distractedness score, etc.). The vehicle operator may be determined to be impaired when any of the total scores fall below a minimum threshold value or exceed a maximum threshold value. Additionally, the mobile device or on-board computer may communicate with one or more servers, which may perform part or all of the aforementioned functions. In some embodiments, the total impairment scores may be used to adjust a risk level used in rating and underwriting an insurance policy of the vehicle operator.

In one embodiment, the method may predict whether presenting information to the vehicle operator (e.g., e-mail, text messages, etc.) would cause the vehicle operator to become impaired based on the sensor data. In such situations, the method could determine to delay presentation of the information to the vehicle operator until a later time when presenting the information would not cause an impairment (e.g., in lighter traffic, after merging onto a road, etc.). In another embodiment, the method may determine whether the vehicle operator is unimpaired prior to returning control to the vehicle operator of a vehicle that is operating automatically.

Another embodiment consists of a computer system including one or more processors, sensors, and program memories storing instructions that when executed by the one or more processors cause the computer system to receive data about the vehicle operator, vehicle operation, and vehicle environment from one or more sensors, process the sensor data to determine whether the vehicle operator is impaired, determine one or more responses to alert the vehicle operator or mitigate the impairment when one is determined to exist, and cause the responses to be implemented. Another embodiment consists of a tangible, non-transitory computer-readable medium storing instructions that when executed by one or more processors of a computer system cause the computer system to receive data about the vehicle operator, vehicle operation, and vehicle environment from one or more sensors, process the sensor data to determine whether the vehicle operator is impaired, determine one or more responses to alert the vehicle operator or mitigate the impairment when one is determined to exist, and cause the responses to be implemented.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

As used herein, the term "impairment" refers to any of a number of conditions that may reduce vehicle operator performance. A vehicle operator may be impaired if the vehicle operator is drowsy, asleep, distracted, intoxicated, ill, injured, suffering from a sudden onset of a medical condition, or in an impaired emotional state such as anxiety, agitation, aggression, nervousness, hyperactivity, or mania. Additionally, as used herein, the term "vehicle" may refer to any of a number of motorized transportation devices. A vehicle may be a car, truck, bus, train, boat, plane, etc.

Figure 1:
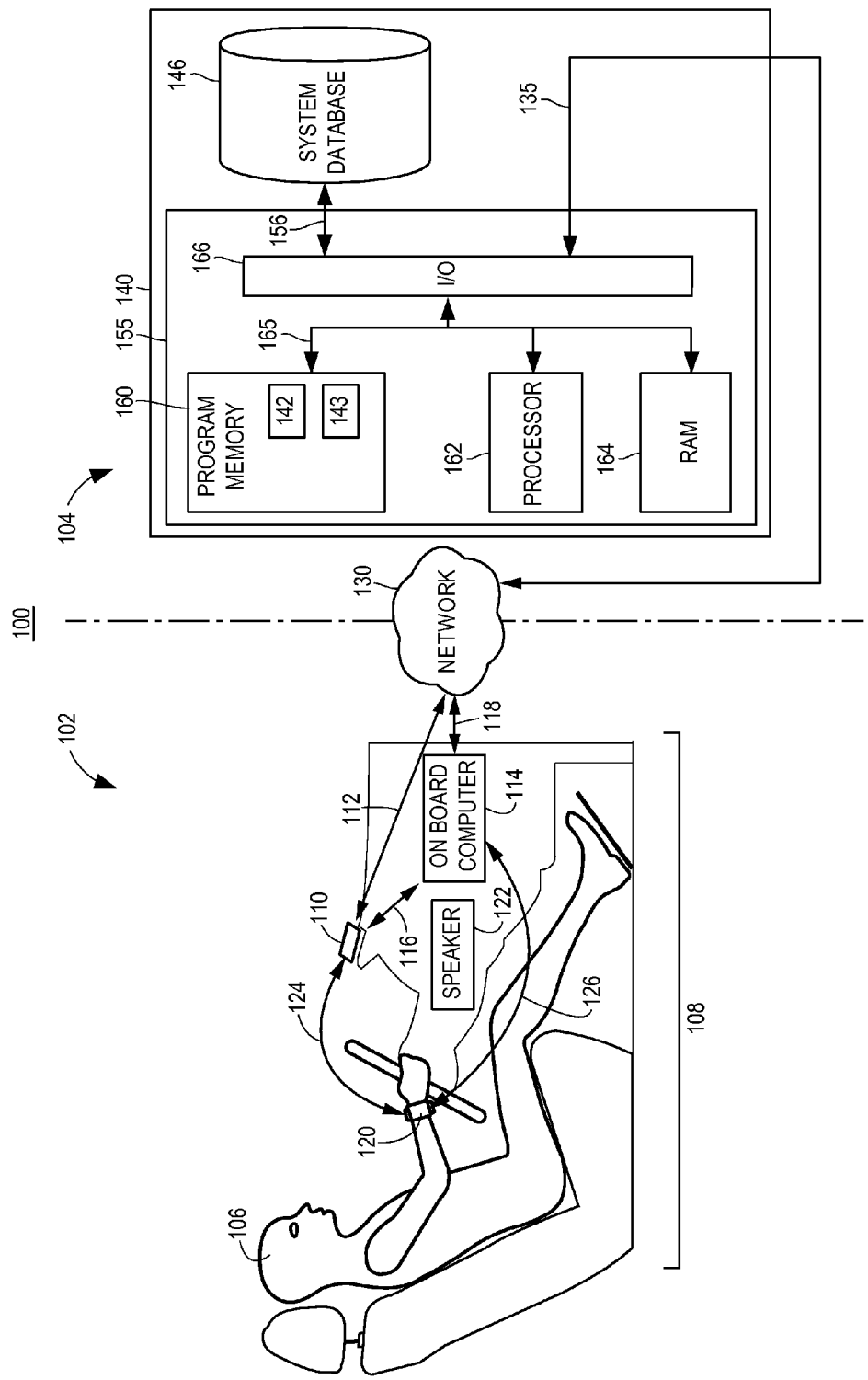
FIG. 1 illustrates a block diagram of a computer network, a computer server, a mobile device, and an on-board computer on which an exemplary vehicle operator impairment detection and mitigation method may operate in accordance with the described embodiments.

FIG. 1 illustrates a block diagram of an exemplary vehicle operator impairment detection and mitigation system 100. The high-level architecture includes both hardware and software applications, as well as various data communications channels for communicating data between the various hardware and software components. The vehicle operator impairment detection and mitigation system 100 may be roughly divided into front-end components 102 and back-end components 104. The front-end components 102 monitor a vehicle operator 106 for indications of impairment using data from a variety of sensors within a vehicle 108 (e.g., a car, truck, etc.). The sensors may be disposed within a mobile computing device 110 or a physiological sensor 120. Various other sensors (not shown) may be installed within the vehicle 108 and may communicate with the mobile device 110 or an on-board computer 114. The front-end components 102 may further process the sensor data using the mobile device 110 or on-board computer 114 to determine whether the vehicle operator 106 is impaired. When an impairment is determined to exist, an appropriate response or responses to mitigate the impairment may be determined using the mobile device 110 or on-board computer 114. The responses may include alerting the vehicle operator 106, presenting mitigating stimuli (e.g., music, messages, etc.), or taking other actions to reduce distractions, drowsiness, or negative emotional state (e.g., anxiety, agitation, or aggression) influences on the vehicle operator 106. In some embodiments of the system, the front-end components 102 may communicate with the back-end components 104 via a network 130. The back-end components 104 may use one or more servers 140 to process the sensor data provided by the front-end components 102 to determine whether the vehicle operator 106 is impaired and communicate the determination to the front-end components 102 via the network 130. Additionally, or alternatively, the back-end components 104 may determine appropriate responses to mitigate an impairment. Mitigating stimuli may be stored either in the front-end components or streamed to the front-end components via network 130.

The front-end components 102 are disposed within one or more mobile devices 110 or on-board computers 114, which may be permanently or removably installed in the vehicle 108. The mobile device 110 or the on-board computer 114 may interface with one or more physiological sensors 120 or various other sensors (not shown) within the vehicle 108 (e.g., a braking sensor, a speedometer, a tachometer, an accelerometer, an optical sensor, a microphone, etc.), which sensors may also be incorporated within or connected to the mobile device 110 or the on-board computer 114. In some embodiments, the various other sensors (not shown) may perform part or all of the functions of the physiological sensor 120, in which case the physiological sensor 120 may not be present. Any of the sensors within the vehicle 108 may be installed by the manufacturer of the vehicle 108 or as an aftermarket modification to the vehicle 108. The mobile device 110 or the on-board computer 114 may further interface with various output devices in the vehicle 108, such as one or more speakers 122 or displays (not shown). The physiological sensor 120 may include a thermometer, microphone, thermal image capture device, electroencephalograph (EEG), galvanic skin response (GSR) sensor, heart rate sensors, respiratory rate sensor, or other biometric sensors. The sensors may also include other sensors currently existing or later developed.

The on-board computer 114 may supplement the functions performed by the mobile device 110 described herein by, for example, sending or receiving information to and from the mobile device 110 or the physiological sensor 120. In one embodiment, the on-board computer 114 may perform all of the functions of the mobile device 110 described herein, in which case no mobile device 110 may be present in the system 100. In another embodiment, the mobile device 110 may perform all of the functions of the on-board computer 114, in which case no on-board computer 114 may be present in the system 100. The mobile device 110 or on-board computer 114 may communicate with the network 130 over links 112 and 118, respectively. Additionally, the mobile device 110 and on-board computer 114 may communicate with one another directly over link 116.

The mobile device 110 may be either a general-use mobile personal computer, cellular phone, smart phone, tablet computer, or wearable device (e.g., a watch, glasses, etc.) or a dedicated vehicle operator impairment monitoring computer. The on-board computer 114 may be a general-use on-board computer capable of performing many functions relating to vehicle operation or a dedicated computer for monitoring vehicle operator impairment. Further, the on-board computer 114 may be installed by the manufacturer of the vehicle 108 or as an aftermarket modification to the vehicle 108. In some embodiments, the mobile device 110 or on-board computer 114 may be thin-client devices that outsource some or most of the processing to the server 140.

One or more vehicle operators 106 may operate the vehicle 108. While shown in a slightly reclined sitting position, those of ordinary skill in the art will appreciate that the vehicle operator 106 could be situated in any number of ways (e.g., reclining at a different angle, standing, etc.) and may operate the vehicle 108 using controls other than the steering wheel and pedals shown in FIG. 1 (e.g., one or more sticks, yokes, levers, etc.).

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol. The back-end components 104 include one or more servers 140. Each server 140 may include one or more computer processors adapted and configured to execute various software applications and components of the vehicle operator impairment detection and mitigation system 100, in addition to other software applications. The server 140 may further include a database 146, which may be adapted to store data related to the operation of the vehicle operator impairment detection and mitigation system 100. Such data might include, for example, images, sensor inputs, data analyzed according to the methods discussed below, or other kinds of data pertaining to the vehicle operator impairment uploaded to the server 140 via the network 103. The server 140 may access data stored in the database 146 when executing various functions and tasks associated with the operation of the vehicle operator impairment detection and mitigation system 100.

Although the vehicle operator impairment detection and mitigation system 100 is shown to include one mobile device 110, one on-board computer 114, one physiological sensor 120, and one server 140, it should be understood that different numbers of mobile devices 110, on-board computers 114, physiological sensors 120, and servers 140 may be utilized. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein. Alternatively, the vehicle operator impairment detection and mitigation system 100 may include only the front-end components 102. For example, a physiological sensor 120 may provide data to a mobile device 110 or on-board computer 114, which may perform all of the processing associated with receiving sensor data, determining whether the vehicle operator 106 is impaired based on the received sensor data, determining appropriate mitigating responses, and implementing the responses (e.g., presenting a response to the vehicle operator 106 through a speaker 122). As such, the vehicle operator impairment detection and mitigation system 100 may be a "stand-alone" system, neither sending nor receiving information over the network 130.

The server 140 may have a controller 155 that is operatively connected to the database 146 via a link 156. It should be noted that, while not shown, additional databases may be linked to the controller 155 in a known manner. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications may include a client application 142 for implementing the vehicle operator impairment detection and mitigation system 100 on the server 140. The software applications may further include a web server application 143 responsible for generating data content to be included in web pages sent from the web server 140 to the mobile device 110 or on-board computer 114. The various software applications may be executed on the same computer processor as the client application 142 or the web server application 143, or the software application may be executed on different computer processors.

Figure 2:
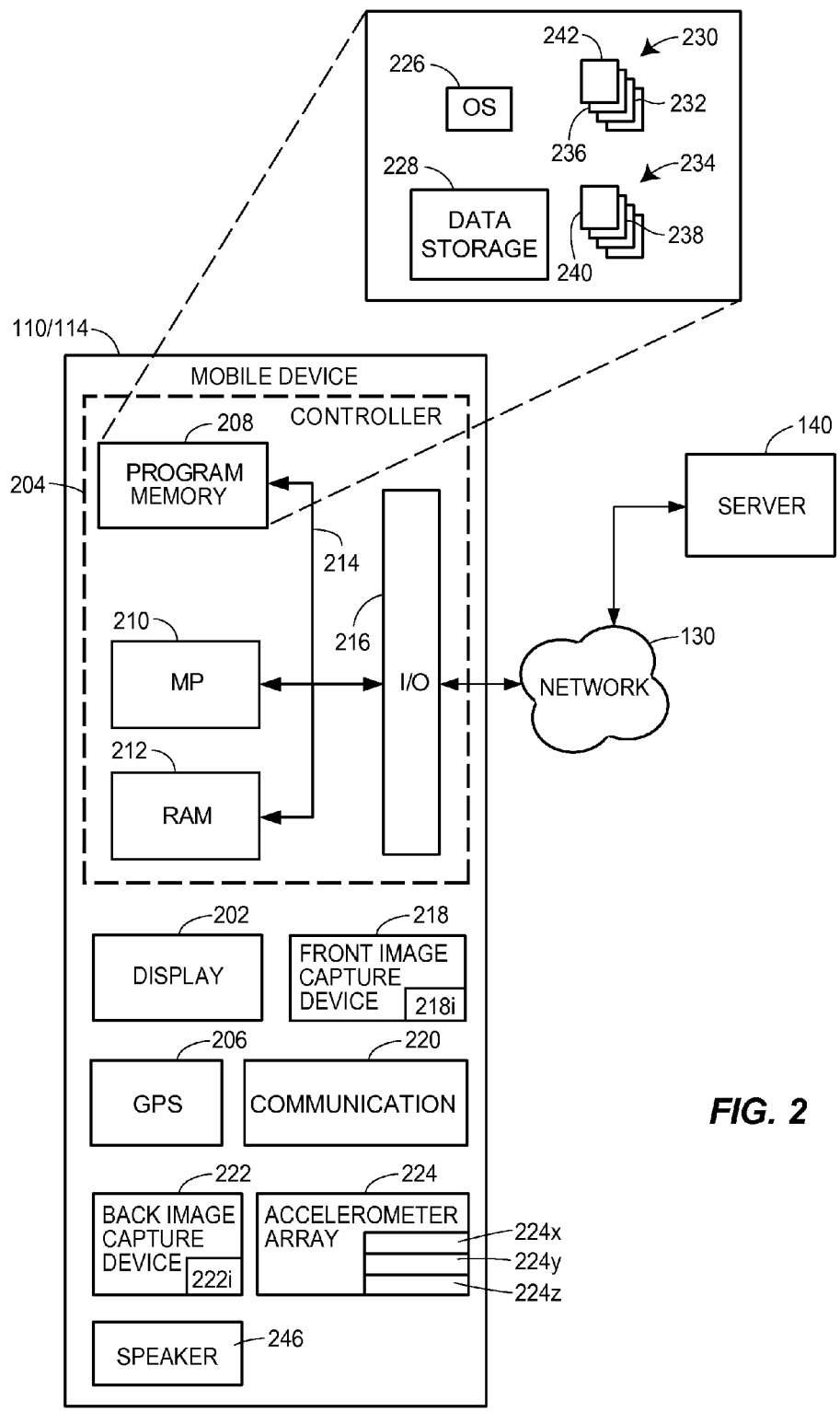
FIG. 2 illustrates a block diagram of an exemplary mobile device or on-board computer.

FIG. 2 illustrates a block diagram of a mobile device 110 or an on-board computer 114 for implementing the system for receiving sensor data, determining whether the vehicle operator 106 is impaired based on the received sensor data, determining appropriate mitigating responses, and implementing the responses. The sensor data may come from sensors incorporated within the mobile device 110 or on-board computer 114. Additionally, or alternatively, the communication unit 220 may receive sensor data from one or more external sensors within the vehicle 108 or from the physiological sensor 120. The sensor data may be processed by the controller 204 to determine whether the vehicle operator 106 is in an impaired emotional state. When the controller 204 determines that operator impairment exists, appropriate responses are determined using the controller 204 based upon the type of impairment and the sensor data. Different types of impairments (e.g., drowsiness, aggression, or distraction) may trigger different types of responses (e.g., alerts, messages, recommendations, or visual or auditory stimuli). The mobile device 110 or on-board computer 114 then controls the presentation of the response to the vehicle operator 106 using the display 202, speakers 122 or 246, or other appropriate output devices, such as additional displays (not shown) or haptic feedback devices (not shown). Additionally, or alternatively, the mobile device 110 or on-board computer 114 may transmit the sensor data to the server 140 for processing or may receive responses determined by the server 140 for presentation to the vehicle operator 106 via the network 130.

The mobile device 110 or on-board computer 114 may include a display 202, a Global Positioning System (GPS) unit 206, a communication unit 220, a front image capture device 218, a back image capture device 222, an accelerometer array 224, one or more additional sensors (not shown), a user-input device (not shown), a speaker 246, and, like the server 140, a controller 204. In some embodiments, the mobile device 110 and on-board computer 114 may be integrated into a single device, or either may perform the functions of both. Functions performed by either the mobile device 110 or the on-board computer 114 may also be performed by the mobile device 110 in concert with the on-board computer 114.

Similar to the controller 155, the controller 204 includes a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and a plurality of software routines 234. The operating system 226, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 228 may include data such as user profiles and preferences, application data for the plurality of applications 230, routine data for the plurality of routines 234, and other data necessary to interact with the server 140 through the digital network 130. In some embodiments, the controller 204 may also include, or otherwise be communicatively connected to, other data storage mechanisms (e.g., one or more hard disk drives, optical storage drives, solid state storage devices, etc.) that reside within the mobile device 110 or on-board computer 114.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although the FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The communication unit 220 may communicate with one or more external sensors within the vehicle 108, mobile devices 110, on-board computers 114, physiological sensors 120, or servers 140 via any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 220 may also be capable of communicating using a near field communication standard (e.g., ISO/IEC 18092, standards provided by the NFC Forum, etc.). Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, physiological sensors 120, or servers 140.

The GPS unit 206 may use "Assisted GPS" (A-GPS), satellite GPS, or any other suitable global positioning protocol (e.g., the GLONASS system operated by the Russian government) or system that locates the position of the mobile device 110 or on-board computer 114. For example, A-GPS utilizes terrestrial cell phone towers or Wi-Fi hotspots (e.g., wireless router points) to more accurately and more quickly determine location of the mobile device 110 or on-board computer 114, while satellite GPS generally is more useful in more remote regions that lack cell towers or Wi-Fi hotspots. The front and back image capture devices 218 and 222 may be built-in cameras within the mobile device 110 or on-board computer 114 or may be peripheral cameras, such as webcams, dashcams, or other cameras installed inside or outside the vehicle 108 that are communicatively coupled with the mobile device 110 or on-board computer 114. The front image capture device 218 may be oriented toward the vehicle operator 106 to observe the vehicle operator 106 as described below. The back image capture device 222 may be oriented toward the front of the vehicle 108 to observe a road, lane markings, or other objects in front of the vehicle 108. Some embodiments may have both a front image capture device 218 and a back image capture device 222, but other embodiments may have only one or the other. Further, either or both of the front image capture device 218 and back image capture device 222 may include an infrared illuminator 218i, 222i, respectively, or other device to facilitate low light or night image capturing. Such infrared illuminators 218i and 222i may be automatically activated when light is insufficient for image capturing. The accelerometer array 224 may be one or more accelerometers positioned to determine the force and direction of movements of the mobile device 110 or on-board computer 114. In some embodiments, the accelerometer array 224 may include an X-axis accelerometer 224x, a Y-axis accelerometer 224y, and a Z-axis accelerometer 224z to measure the force and direction of movement in each dimension respectively. It will be appreciated by those of ordinary skill in the art that a three dimensional vector describing a movement of the mobile device 110 or on-board computer 114 through three dimensional space can be established by combining the outputs of the X-axis, Y-axis, and Z-axis accelerometers 224x, y, z using known methods. The GPS unit 206, the front image capture device 218, the back image capture device 222, the accelerometer array 224, and the one or more other sensors (not shown) may be referred to collectively as the "sensors" of the mobile device 110 or on-board computer 114. Of course, it will be appreciated that additional GPS units 206, front image capture devices 218, back image capture devices 222, or accelerometer arrays 224 may be added to the mobile device 110 or on-board computer 114.

Furthermore, the mobile device 110, on-board computer 114, or physiological sensor 120 may also include (or be coupled to) other sensors such as a thermometer, microphone, thermal image capture device, electroencephalograph (EEG), galvanic skin response (GSR) sensor, heart rate sensor, other biometric sensors, etc. Physiological sensor data may be used to measure indications that the vehicle operator 106 is emotionally impaired or drowsy. A thermometer or thermal image capture device may be used to determine an abnormal body temperature or a change in body temperature of the vehicle operator 106 that may indicate stress or drowsiness. A microphone may be used to receive voice inputs, and may also be used to detect irregularities in the voice of the vehicle operator 106 indicating that vehicle operator 106 is agitated or under stress. An EEG may be used to determine whether a vehicle operator 106 is stressed, distracted, or otherwise impaired. A GSR sensor may be used to detect whether the vehicle operator 106 is stressed (i.e., that the conductance of the vehicle operator's 106 skin has varied from its normal level). Other biometric sensors may similarly be used to detect whether a vehicle operator 106 is in an impaired emotional state. The sensors of the mobile device 110 and the on-board computer 114, together with the physiological sensor 120 and any additional sensors within the vehicle 108 that are communicatively connected to the mobile device 110 or the on-board computer 114, may be referred to collectively as the "sensors" of the vehicle operator impairment detection and mitigation system 100.

The user-input device (not shown) may include a "soft" keyboard that is displayed on the display 202 of the mobile device 110 or on-board computer 114, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

The one or more processors 210 may be adapted and configured to execute any of one or more of the plurality of software applications 230 or any one or more of the plurality of software routines 234 residing in the program memory 204, in addition to other software applications. One of the plurality of applications 230 may be a client application 232 that may be implemented as a series of machine-readable instructions for performing the various tasks associated with implementing part or all of the vehicle operator impairment detection and mitigation system 100 as well as receiving information at, displaying information on, and transmitting information from the mobile device 110 or on-board computer 114. The client application 232 may function to implement a stand-alone system or as a system wherein the front-end components 102 communicate with back-end components 104 as described herein. The client application 232 may include machine-readable instruction for implementing a user interface to allow a user to input commands to and receive information from vehicle operator impairment detection and mitigation system 100. One of the plurality of applications 230 may be a native web browser 236, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 140. Another application of the plurality of applications may include an embedded web browser 242 that may be implemented as a series of machine-readable instructions for receiving, interpreting, and displaying web page information from the server 140. One of the plurality of routines may include an image capture routine 238 that coordinates with the front image capture device 218 or back image capture device 222 to retrieve image data for use with one or more of the plurality of applications, such as the client application 232, or for use with other routines. Another routine in the plurality of routines may include an accelerometer routine 240 that determines the force and direction of movements of the mobile device 110 or on-board computer 114. The accelerometer routine 240 may process data from the accelerometer array 224 to determine a vector describing the motion of the mobile device 110 or on-board computer 114 for use with the client application 232. In some embodiments where the accelerometer array 224 has X-axis, Y-axis, and Z-axis accelerometers 224x, y, and z, the accelerometer routine 240 may combine the data from each accelerometer 224x, y, and z to establish a vector describing the motion of the mobile device 110 or on-board computer 114 through three dimensional space. Furthermore, in some embodiments, the accelerometer routine 240 may use data pertaining to less than three axes, such as when determining when the vehicle 108 is braking.

A user may launch the client application 232 from the mobile device 110 or on-board computer 114, to access the server 140 to implement the vehicle operator impairment detection and mitigation system 100. Additionally, the user may also launch or instantiate any other suitable user interface application (e.g., the native web browser 236, or any other one of the plurality of software applications 230) to access the server 140 to realize the vehicle operator impairment detection and mitigation system 100.

In embodiments where the mobile device 110 or on-board computer 114 is a thin-client device, the server 140 may perform many of the processing functions remotely that would otherwise be performed by the mobile device 110 or on-board computer 114. In such embodiments, the mobile device 110 or on-board computer 114 may gather data from its sensors or other sensors as described herein. Rather than analyzing the data locally, however, the mobile device 110 or on-board computer 114 may instead send the data to the server 140 for remote processing. The server 140 may perform the analysis of the gathered data to determine whether the vehicle operator 106 may be impaired. If the server 140 determines that the vehicle operator 106 is impaired, the server 140 may determine one or more appropriate responses to alert the vehicle operator or to mitigate the impairment. The server 140 may then command the mobile device 110 or on-board computer 114 to implement the response as described below. Additionally, the server 140 may generate metrics and suggestions regarding vehicle operator emotional impairment based on the gathered data.

Figure 3:
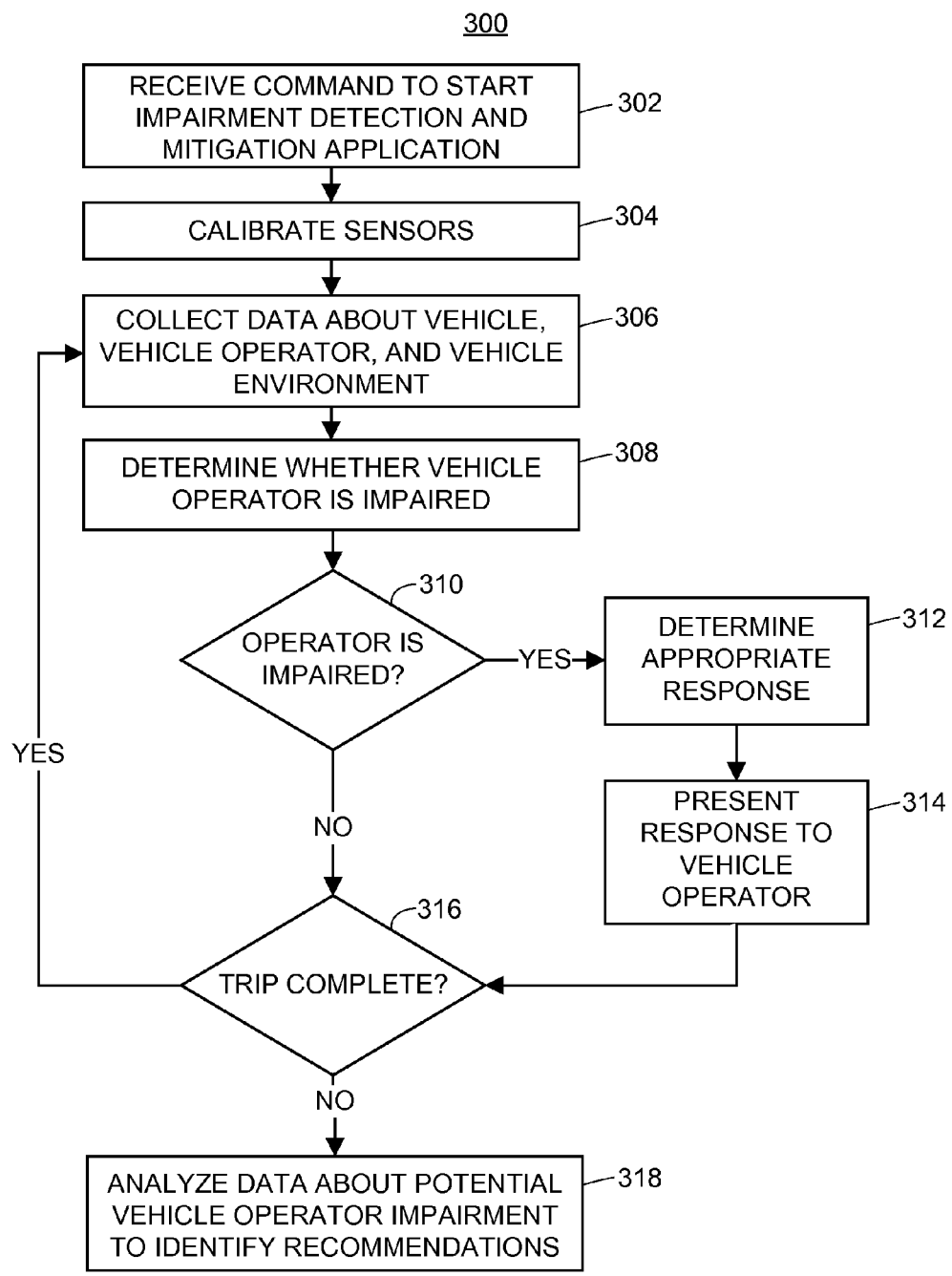
FIG. 3 depicts an exemplary vehicle operator impairment detection and mitigation method in accordance with the presently described embodiments.

FIG. 3 is a flow diagram depicting an exemplary embodiment of a vehicle operator impairment detection and mitigation method 300 implemented by the vehicle operator impairment detection and mitigation system 100. More particularly the method 300 may be performed by the mobile device 110 or on-board computer 114 or by either or both of these in conjunction with the server 140. The method 300 may be initiated by a command (block 302), following which the sensors may be calibrated (block 304). When in operation, the method 300 collects sensor data about the vehicle operator 106, movement of the vehicle 108, and the environment in which the vehicle 108 is traveling (block 306) and processes the sensor data to determine whether the vehicle operator 106 is impaired (block 308). When an impairment is determined to exist (block 310), the method 300 selects an appropriate response to present to the vehicle operator 106 (block 312) and then presents the response to the vehicle operator 106 (block 314). In the exemplary embodiment, the method 300 continues to monitor the sensors for indications of vehicle operator impairment until the trip is complete (block 316), but other embodiments may continue monitoring for an extended period or may terminate monitoring prior to the completion of the trip under certain circumstances. Either during or after vehicle operation, sensor data or determinations of vehicle operator impairment may be stored and analyzed to identify trends in the type, timing, frequency, and causes of impairment of the vehicle operator 106 (block 318).

The command to start the vehicle operator impairment detection and mitigation method 300 may be a user command received by the mobile device 110 or on-board computer 114 via the client application 232. Alternatively or additionally, the command may be sent by the server 140 or may be generated automatically by the mobile device 110 or on-board computer 114 after the meeting of a condition (e.g., the vehicle 108 has been started, the mobile device 110 is within a specified distance of the vehicle, a certain time, etc.). In some embodiments, the vehicle operator impairment detection and mitigation system may continuously collect sensor data following a first command to initiate a client application 232 but may only perform method 300 following a second command (block 302). In such embodiments, the sensors may be calibrated both after the first command and after the second command.

Following initiation of the method 300, the physiological sensor 120 and the sensors of the mobile device 110 or on-board computer 114 may be calibrated (block 304). For example the front image capture device 218 may attempt to detect the face and eyes of the vehicle operator 106. Calibration may further entail adjusting the front image capture device 218 to account for the skin tone or facial characteristic of the vehicle operator 106, ambient light in the vehicle, the background behind the vehicle operator 106, etc. The back image capture device 222 may also be calibrated, such as by attempting to detect a road in front of the vehicle, identify lane markings, identify other vehicles, detect coastlines or a water surface, or detect a horizon. Calibration may further entail adjusting the back image capture device 222 to account for the color of the road, road conditions (e.g., a wet road or an icy road), lane markings, wind speed, wave height, cloud cover, time of day, ambient light, precipitation, etc. The accelerometer array 224 may also be calibrated. Such calibration may entail accounting for constant vibration (e.g., the vibration caused by the engine of the vehicle 108) or other repetitive forces applied to the mobile device 110 or on-board computer 114. The physiological sensor 120 or other biometric sensors may be calibrated by measuring the vehicle operator's 106 pulse rate, respiratory rate, skin conductance, etc. Other sensors may similarly be calibrated upon initialization of the method 300 or at intervals during monitoring. Changes in the sensor measurements from the baseline established during calibration may indicate the vehicle operator 106 is entering or has entered an impaired emotional state, is becoming drowsy, or is becoming distracted. Previously measured sensor data stored in the data storage 228 of the mobile device 110 or the on-board computer 114 or stored in the system database 146 of the server 140 may also be used for calibration. Calibration with previously established baseline measurements is of particular use where a vehicle operator 106 is in an emotionally impaired state at the time of calibration.

After calibration, the mobile device 110 or on-board computer 114 may collect data about potential vehicle operator impairment using the sensors within the vehicle 108 (block 306), including data regarding the following: alertness of the vehicle operator, distractedness of the vehicle operator, emotional state of the vehicle operator, vehicle operator workload, traffic conditions, environmental conditions, or the movement of a vehicle. Unmodified sensor data or determinations of vehicle operator impairment derived therefrom may be stored or recorded in a log file by the mobile device 110, on-board computer 114, or server 140. Sensor data received by sensors connected to one of the mobile device 110 or on-board computer 114 may be communicated to another mobile device 110 or on-board computer 114 for storage or processing. Sensor data may also be communicated to the server 140 via network 130 for storage or processing. Sensor data may include a raw or modified output signal from a physiological sensor 120 or any sensor incorporated within or communicatively connected to a mobile device 110 or on-board computer 114.

Upon receiving the sensor data, the mobile device 110, on-board computer 114, or server 140 processes the sensor data to determine whether the vehicle operator 106 is impaired (block 308). In one embodiment, the mobile device 110 or on-board computer 114 may receive sensor data and transmit the data to the server 140 via network 130, which may be stored in program memory 160 or RAM 164 and processed using processor 162 according to program instructions stored in the program memory 160. Alternatively, or in addition, the physiological sensor 120 may communicate sensor data to the mobile device 110 or on-board computer 114, where the sensor data may be processed or combined with other sensor data prior to transmission to the server 140. Sensor data may also be preprocessed by the mobile device 110 or on-board computer 114 before being sent to another mobile device 110 or on-board computer 114 or to the server 140 for processing to determine whether the vehicle operator 106 is impaired. Such pre-processing may include processing image data to determine pupil dilation or head rotation, calculating a three-dimensional vector from accelerometer array 224 data, detecting proximity to other vehicles from a proximity sensor installed in the vehicle 108 or from image capture data, determining changes in vocal pitch from a microphone in the vehicle 108 or the mobile device 110, etc.

Figure 4:
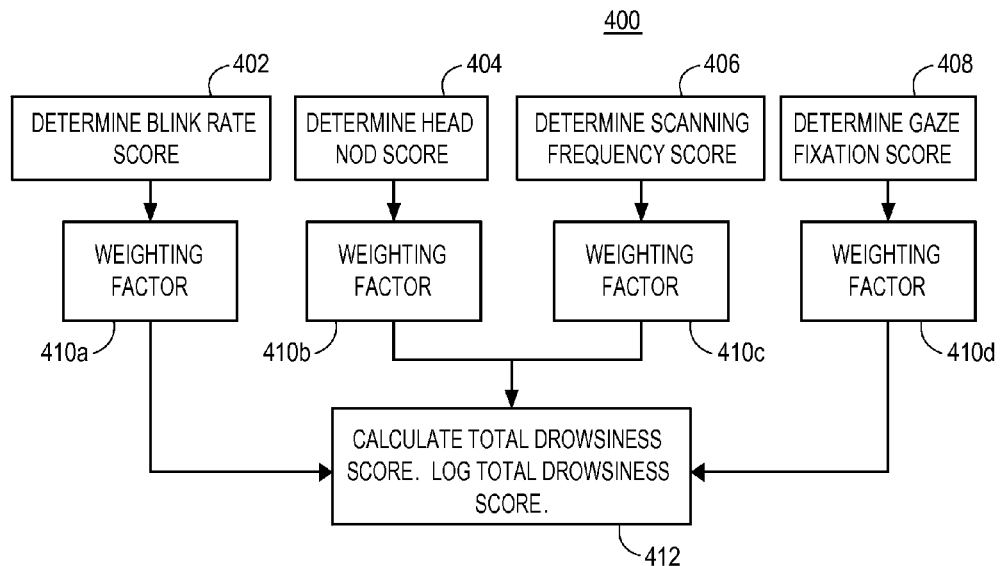
FIG. 4 depicts an exemplary vehicle operator drowsiness score determination method for implementing the vehicle operator impairment detection and mitigation method in accordance with the presently described embodiments.
Figure 5:
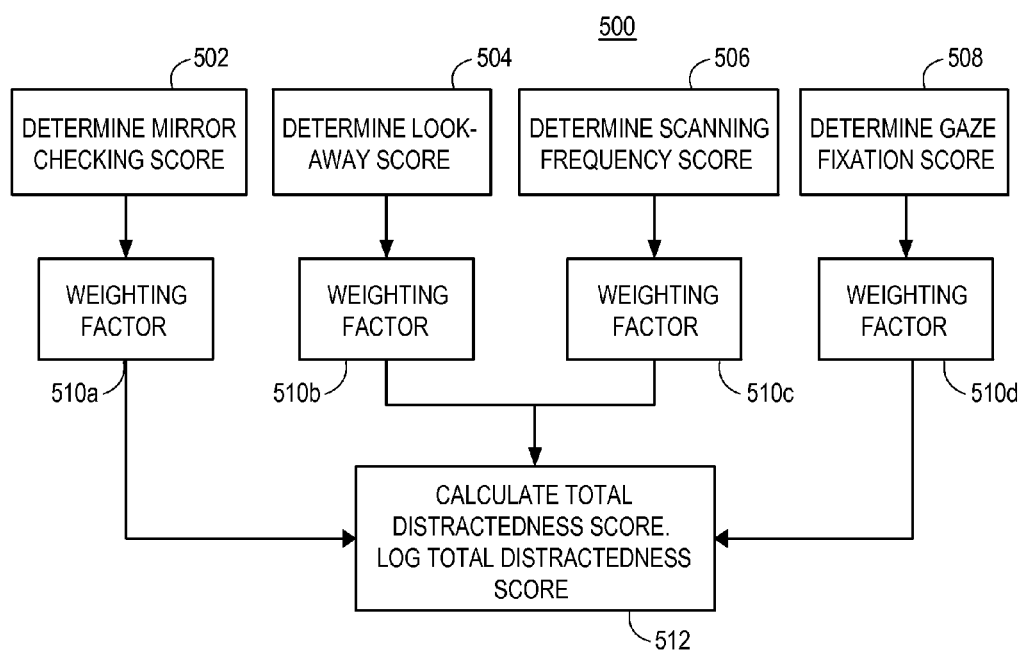
FIG. 5 depicts an exemplary vehicle operator distractedness score determination method for implementing the vehicle operator impairment detection and mitigation method in accordance with the presently described embodiments.
Figure 6:
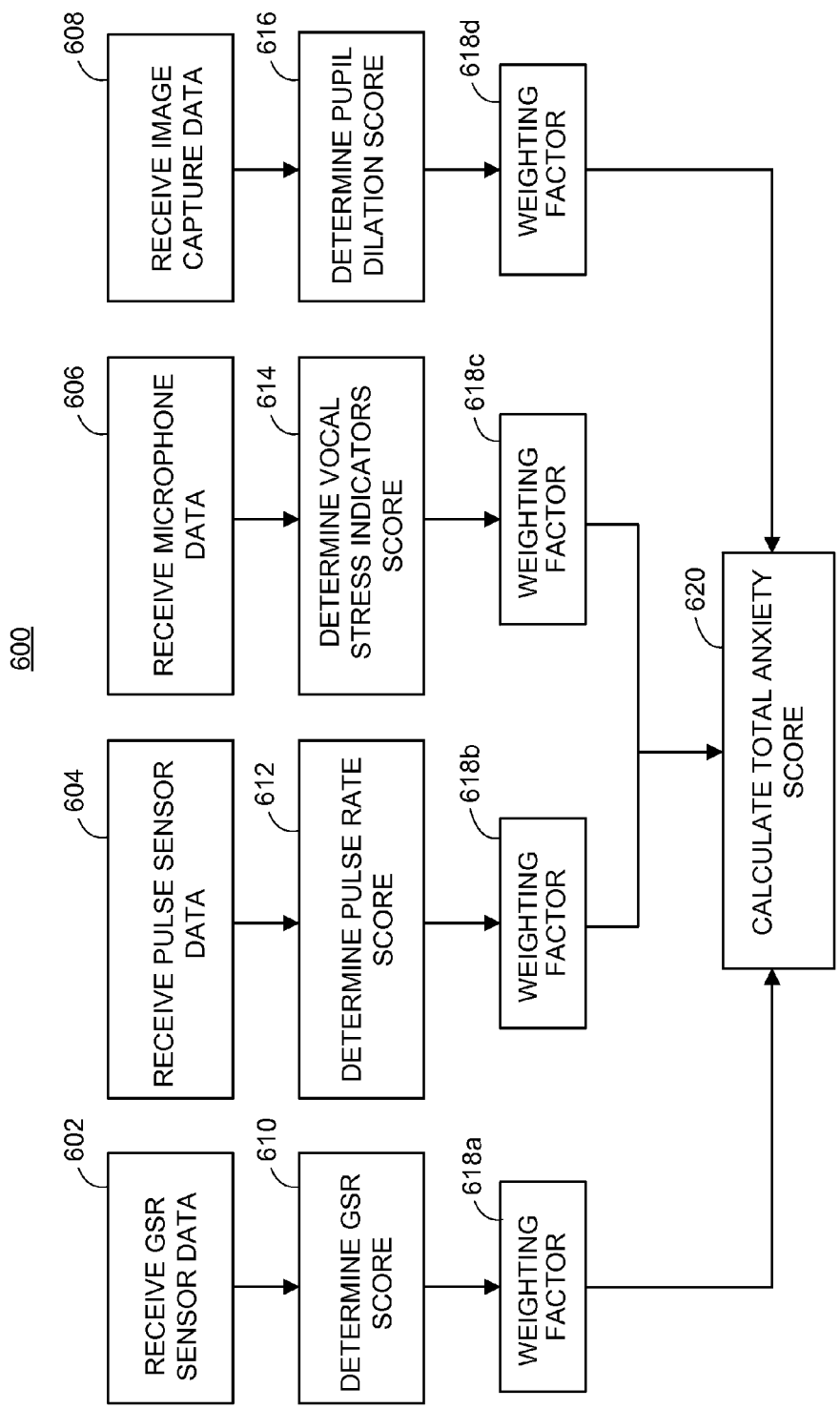
FIG. 6 depicts an exemplary vehicle operator anxiety score determination method for implementing the vehicle operator impairment detection and mitigation method in accordance with the presently described embodiments.

Determining whether the vehicle operator 106 is impaired may include separate but complimentary determinations such as whether the vehicle operator 108 is exhibiting signs of drowsiness, as shown in FIG. 4, distraction, as shown in FIG. 5, or anxiety, as shown in FIG. 6. It will be appreciated by those of ordinary skill in the art that these determinations may be made within a single process as well. Furthermore, the methods of determining vehicle operator emotional state depicted in FIGS. 4-6 are exemplary only; additional or alternative methods may be used to determine whether the vehicle operator is impaired and the type of such impairment. In addition to sensor data, additional information (e.g., traffic or weather conditions, local attractions or facilities, news items, electronic mail, social media items, etc.) may be obtained from external sources via network 130.

The method of determining impairment of a vehicle operator may include determining one or more impairment indicators. Impairment indicators may be a series of measurements of conditions or characteristics pertaining to potential vehicle operator impairment derived from the sensors communicatively connected to the mobile device 110 or on-board computer 114. Such measurements may be logged and stored in data storage 228 as an impairment indicator log, along with a timestamp to note the time of the measurement. Examples of impairment indicators include the following: vehicle operator blinks, frequency of vehicle operator blinks, duration of vehicle operator blinks, percent eye closed, vehicle operator gaze location, vehicle operator gaze fixation, vehicle operator head nods, vehicle operator head rotations, vehicle operator arm movement, vehicle position relative to lane markings, lane deviation, failure to maintain lane centering, vehicle position relative to other vehicles, time to collision, time to brake, time to react, longitudinal vehicle control, vehicle braking, acceleration of the vehicle along any of multiple axes, etc.

Vehicle operator blinks may be determined using data from front image capture device 218 by watching the eyes of the vehicle operator 106 and determining when the visible size of the eyes decreases below a threshold value (e.g., two pixels) then increased above a threshold value after a blink. Frequency of vehicle operator blinks may then be calculated as a function of the time between blinks over a certain time period (e.g., 2 minutes, 5 minutes, etc.). Vehicle operator gaze location may be determined by monitoring the eyes of the vehicle operator 106 with the front image capture device 218. Vehicle operator gaze location may be used to determine when the vehicle operator 106 is looking at the road, mirrors, the dashboard, stereo or air conditioning controls, a mobile device, etc. and may be used to determine when gaze fixation has exceeded a threshold time period (e.g., 2 seconds, 5 seconds, etc.). Operator head nods, head rotations, and vehicle operator arm movements (e.g., holding a steering wheel, using a turn signal, grasping or holding an object such as a beverage or cellular phone, etc.) may likewise be measured by monitoring the vehicle operator 106 with the front image capture device 218 and detecting a vertical or horizontal acceleration of the vehicle operator's face exceeding threshold values. Vehicle acceleration may be measured using the accelerometer array 224 to monitor forces in multiple axes. Vehicle acceleration may be used to determine hard braking, sharp acceleration, or swerving.

The back image capture device 222 may be used to monitor conditions on the road including identifying lane markings or other vehicles on the road by processing and comparing a series of images. Lane deviation may be determined by comparing the relative position of lane markings relative to image sensor input at multiple points in time. Time to collision may be determined by comparing vehicle position relative to other vehicles to determine when a decreasing time to collision indicates that the vehicle 108 may be too close to another vehicle, and vehicle acceleration measurements may be used in the determination. Alternatively or additionally, the data used to calculate time to collision may be used to calculate similar metrics such as time to brake (i.e., the amount of time the vehicle operator 106 has to apply the brakes in order to prevent collision with an object) or time to react (i.e., the amount of time a vehicle operator 106 has to recognize an imminent collision and react to prevent it by swerving or applying the brakes). In addition to the data used to calculate time to collision, it may be advantageous to incorporate additional data into the calculation of time to brake and time to react such as the stopping capability of the vehicle 108, road conditions (e.g., wet, icy, unpaved, etc.), and the previously observed reaction time of the vehicle operator 106.

FIG. 4 is a flow diagram depicting an exemplary embodiment of a vehicle operator drowsiness score determination method 400 implemented by the vehicle operator impairment detection and mitigation system 100 while determining whether the vehicle operator 106 is impaired at block 308. The method 400 determines a blink rate score, a head nod score, a scanning frequency score, and a gaze fixation score using one or more impairment indicators (blocks 402, 404, 406, and 408). Blink rate score may be determined by subtracting 1 point from a total score of 100 every time the blink rate of the vehicle operator 106 exceeds a threshold value (e.g., one blink per second) during a certain period of time (e.g., 1 minute, 2 minutes). Head nod score may be determined by subtracting 1 point from a total score of 100 every time a head nod is detected during a certain period of time. Scanning frequency score may be determined by subtracting 1 point from a total score of 100 every time the vehicle operator 106 fails to shift his or her gaze from one important area for vehicle operation (e.g., the road, mirrors, etc.) to another important area for vehicle operation within a threshold period of time (e.g., 5 seconds). For example, a vehicle operator 106 who is drowsy may not look from the road to check the mirrors and speed indicator with sufficient frequency. The gaze fixation score may be determined by subtracting 1 point from a total score of 100 every time gaze fixation is detected during a certain period of time.

After determining scores for the individual impairment indicators as discussed above, the method 400 may multiply each score by a weighting factor 410a, b, c, or d. For example, if each score is weighted equally, the weighting factors 410a-d will be identical. However, it may be advantageous to weight one score higher than another. For example, head nods may indicate that the vehicle operator 106 is falling asleep and may be more important than scanning frequency or gaze fixation in determining whether the vehicle operator 106 is drowsy. In such an embodiment, the weighting factors 410*a-d* may be 0.25, 0.35, 0.20, and 0.20 respectively. In some embodiments, the weighting factors may be adjusted based on previous data for the user or for a large group of users. The weighting factors may be adjusted by one of the many known learning algorithms such as a support vector machine or neural network algorithms. The method 400 may then sum the weighted scores to determine a total drowsiness score (block 412). The total drowsiness score may be logged with a timestamp and stored in data storage 228 or sent to the server 140 for remote storage. Referring again to FIG. 3, if the drowsiness score is below an impairment threshold value (e.g., 90 out of 100), the vehicle operator impairment detection and mitigation system 100 may determine that the vehicle operator 106 is impaired (block 310).

FIG. 5 is a flow diagram depicting an exemplary embodiment of a vehicle operator distractedness score determination method 500 implemented by the vehicle operator impairment detection and mitigation system 100 while determining whether the vehicle operator 106 is impaired at block 308. The method 500 may determine a mirror checking score, look-away score, scanning frequency score, and gaze fixation score using one or more impairment indicators (block 502, 504, 506, and 508). A mirror checking score may be determined by subtracting 1 point from a total score of 100 every time the vehicle operator fails to look at a mirror within a threshold period of time over a certain period of time (e.g., 1 minute, 2 minutes). Look-away score may be determined by subtracting 1 point from a total score of 100 every time the frequency or duration of a look-away exceeds a threshold period of time during a certain period of time. Look-aways may include head rotations and gaze location on a distraction (e.g., the stereo, a mobile phone, etc.). Scanning frequency score can be determined by subtracting 1 point from a total score of 100 every time the vehicle operator 106 fails to shift his or her gaze from one important area for vehicle operation (e.g., the road, mirrors, etc.) to another important area for vehicle operation within a threshold period of time (e.g., 5 seconds) within a certain period of time. For example, a vehicle operator 106 who is distracted may not look from the road to check the mirrors and speed indicator with sufficient frequency. The gaze fixation score may be determined by subtracting 1 point from a total score of 100 every time gaze fixation is detected during a certain period of time.

After determining scores for the individual impairment indicators as discussed above, the method 500 may multiply each score by a weighting factor 510*a, b, c,* or *d* similar to the weighting factors for the vehicle operator drowsiness score determination method 400 discussed above. The weighting factors may likewise be adjusted by one of the many known learning algorithms such as a support vector machine or neural network algorithms. The method 500 may then sum the weighted scores to determine a total distractedness score (block 512). The total distractedness score may be logged with a timestamp and stored in data storage 228 or sent to the server 140 for remote storage. Referring again to FIG. 3, if the distractedness score is below an impairment threshold value (e.g., 90 out of 100), the vehicle operator impairment detection and mitigation system 100 may determine that the vehicle operator 106 is impaired (block 310).

FIG. 6 is a flow diagram depicting an exemplary embodiment of a vehicle operator anxiety score determination method 600 implemented by the vehicle operator impairment detection and mitigation system 100 determining whether the vehicle operator 106 is impaired at block 308. The method 600 determines a GSR score (block 610), a pulse rate score (block 612), a vocal stress indicator score (block 614), and a pupil dilation score (block 616) using data from one or more sensors (blocks 602, 604, 606, and 608). The scores of these impairment indicators (GSR score, pulse rate score, vocal stress indicator score, and pupil dilation score) may then be weighted (blocks 618*a-d*) and combined to determine the total anxiety score (block 620). The GSR score may be determined by multiplying the GSR sensor output voltage in Volts, resistance in Ohms, or conductance in Siemens (block 602) by an appropriate conversion factor such that a baseline score of the vehicle operator 106 in a normal emotional state corresponds to a score of 50 points. The pulse rate score may be determined by multiplying the detected pulse rate by a conversion factor such that a baseline resting pulse rate score of the vehicle operator 106 corresponds to a score of 50 points. The vocal stress indicator score may be determined when the vehicle operator 106 is speaking by multiplying the measured average vocal pitch of the vehicle operator over a period of time (e.g., 2 seconds, 10 seconds, etc.) by a conversion factor such that a baseline unimpaired vehicle operator vocal pitch as determined by prior measurements corresponds to a score of 50 points. The vocal stress indicator score may be set at a default value when no vehicle operator speech is detected, or the prior score may be used until vehicle operator speech is detected or the trip is complete. The pupil dilation score may be determined by using the front image capture device to identify the pupil and estimate the diameter relative to a constant facial feature (e.g., the interpupillary distance) then multiplying the diameter by a conversion factor such that a baseline unimpaired vehicle operator pupil diameter as determined by prior measurements corresponds to a score of 50 points. Of course, any of these or other impairment indicator scores can be calculated by a variety of linear or nonlinear functions mapping the output range of each sensor to the range 0 points to 100 points or to any other convenient point scale.

After determining scores for the individual impairment indicators as discussed above, the vehicle operator anxiety score determination method 600 may multiply each score by a weighting factor 618*a, b, c,* or *d* similar to the weighting factors for the vehicle operator drowsiness score determination method 400 discussed above. The weighting factors may be adjusted by one of the many known learning algorithms such as a support vector machine or neural network algorithms. The method 600 may then sum the weighted scores to determine a total anxiety score (block 620). The total anxiety score may be logged with a timestamp and stored in data storage 228 or sent to the server 140 for remote storage. Referring again to FIG. 3, if the total anxiety score is above a maximum threshold value (e.g., 80 out of 100), the vehicle operator impairment detection and mitigation system 100 may determine that the vehicle operator 106 is impaired due to anxiety (block 310). Additionally, if the total anxiety score is below a minimum threshold value (e.g., 20 out of 100), the vehicle operator impairment detection and mitigation system 100 may determine that the vehicle operator 106 is likewise impaired due to anxiety (block 310).

Alternatively, it will be understood that instead of a weighted sum adding up to a total drowsiness score, a total distractedness score, or a total anxiety score, either may instead be a weighted sum that is subtracted from a maximum score. In such a case, the individual impairment indicator scores discussed above may be calculated differently. While FIGS. 4-6 describe embodiments of methods 400, 500, and 600 using weighted sums to determine the total drowsiness score, total distractedness score, and total anxiety score, respectively, other mathematical operations may be used to determine the total drowsiness score, total distractedness score, and total anxiety score. While the exemplary embodiment discussed above uses a 100 point scale, it will be appreciated that a 100 point scale is just one of many point scales that could be used (e.g., 1 point scale, 50 point scale, 220 point scale, etc.). Alternative or additional sensors and impairment indicators may be used in the determination of any of the total scores. For example, vehicle operator body temperature, vehicle operator arm movements, frequency of lane changes, failure to maintain lane centering, time to collision below a threshold, or swerve impairment indicators may be added to the calculation of the total anxiety score in a manner similar to that described above in connection with FIG. 6. Additionally, or alternatively, total impairment scores other than the total drowsiness score, total distractedness score, and total anxiety score may be determined.

The vehicle operator impairment detection and mitigation system 100 may permit the vehicle operator 106 or another party to adjust the sensitivity setting for the total impairment scores. For example, the decision criteria may be set such that a total anxiety score must exceed 90 out of 100 to register an impairment at block 310. Additionally or alternatively, the vehicle operator impairment detection and mitigation system 100 may include one of the many known learning algorithms such as support vector machine or neural network algorithms to adjust the individual threshold values (e.g., the hard braking or acceleration thresholds) or conversion factors (e.g., the GSR conversion factor or the pulse rate conversion factor) discussed above. The learning algorithm may operate in connection with the server 140 to adjust threshold levels, weighting factors, or sensitivity levels based on calculations performed using aggregated data from some or all of the mobile devices 110 or on-board computers 114 in the vehicle operator impairment detection and mitigation system 100.

Referring again to FIG. 3, when the vehicle operator impairment detection and mitigation system 100 determines that the vehicle operator 106 is in some way impaired at block 310, the vehicle operator impairment detection and mitigation system 100 selects one or more appropriate responses to the impairment (block 312). The response produced by the method 300 at block 312 may depend upon the type of impairment identified at block 308. Additionally, the determination of an appropriate response may include consideration of other impairment scores, even where no independent impairment would be indicated. For example, the method 300 may determine that a vehicle operator 106 is impaired at block 310 because the total distractedness score has fallen below the threshold, while the total anxiety score may be elevated but still within the unimpaired range. Although the total anxiety score alone would not indicate an impairment, the method 300 may nevertheless determine a response that addresses both distraction and anxiety because of the elevated total anxiety score. Alternatively, the method 300 may determine multiple responses to separately address both distractedness and anxiety. By combining a plurality of approaches to determining vehicle operator impairment, the vehicle operator impairment detection and mitigation method 300 determines more effective responses that mitigate multiple types of impairments simultaneously.

As an example of determining an appropriate response at block 312, an appropriate response following a determination that the vehicle operator 106 is impaired due to drowsiness may consist of providing a visual, audible, or haptic alert to the vehicle operator 106. In some cases of drowsiness, simply causing the vehicle operator 106 to become aware of the impairment may suffice. In other cases, the system 100 may cause a change to the internal environment of the vehicle, such as altering internal lighting, adjusting vehicle ventilation to send blasts of hot or cold air to the vehicle operator 106, or presenting energizing music or other sound recordings through the speaker 211 or 246. Additionally, or alternatively, the system 100 may recommend actions the vehicle operator 106 may take to mitigate the impairment caused by drowsiness, such as suggestions for telephone calls or local destinations to stop (e.g., coffee shops, restaurants, rest areas, parks, gas stations, etc.). Among the suggestions presented to the vehicle operator 106, the system 100 may present coupons, discounts, or other marketing materials for shops, restaurants, attractions, hotels, or other locations near or along the vehicle's route.

As another example, determining an appropriate response to vehicle operator impairment due to distractedness may consist of providing an alert to the vehicle operator 106 as above. The response may also consist of limiting the presentation of information or disruptions from external sources, such as e-mail, SMS text messages, news alerts, weather information, social media updates, phone calls, or other incoming communications or notifications presented by the mobile device 110 or the on-board computer 114. When an impairment due to distractedness has been determined at block 308, the system 100 may delay presenting some or all types of incoming communications with the mobile device 110 or the on-board computer 114 until such time as the vehicle operator 106 is no longer impaired. The response may also consist of grouping incoming communications or notifications to reduce distraction. For example, incoming messages may be presented only when a certain number have been received or only at certain intervals (e.g., not more frequently than every 10 minutes). Additionally, or alternatively, the method 300 may predict whether presentation of incoming communications or notifications would cause a vehicle operator impairment. This prediction may involve predictive analytics on the content of the communication or notification, past reactions of the vehicle operator 106, or other factors. Vehicle operator workload may also be considered, such that incoming communications are delayed or grouped based in part on the required level of concentration required of the vehicle operator 106. For example, merging onto a highway or driving in heavy traffic conditions may cause the system 100 to respond by delaying or grouping incoming communications or notifications. Information regarding traffic conditions or vehicle maneuvering may be determined from sensor data or received by the mobile device 110 or the on-board computer 114 through the network 140, such as by receiving traffic reports or using GPS information to determine the route of the vehicle 108. As with other types of responses, this limitation of presenting information may be configurable by the system 100, the vehicle operator, or another party.

As yet another example, determining an appropriate response to an emotional impairment such as an impairment due to anxiety may further include the presentation of various stimuli to improve the emotional state of the vehicle operator 106. The stimuli may consist of music, other sound recordings (e.g., radio shows, sports broadcasts, personalized messages, recorded ambient sounds, tones, etc.), visual stimuli (e.g., video, still images, dashboard lighting, ambient lighting within the vehicle, etc.), tactile stimuli (e.g., massage functions in a vehicle seat, etc.), temperature stimuli (e.g., blasts of hot or cold air through a vehicle ventilation system, heating or cooling elements in a vehicle seat, etc.), aromatic stimuli, or other stimuli that may affect the emotional state of the vehicle operator 106. The stimuli may be selected from a set stored on the mobile device 110 or on-board computer 114 or from a set stored on the server 140. Alternatively, or additionally, the stimuli may be selected from any source accessible by the mobile device 110, on-board computer 114, or server 140 via the internet or other communication connection (e.g., terrestrial or satellite radio, streaming music services, image or text sharing services, video hosting web services, etc.). Additionally, or alternatively, the response determined at block 312 may include suggestions for telephone calls or local destinations to stop (e.g., coffee shops, gas stations, restaurants, parks, points of historical interest or scenic overlooks, etc.).

In some embodiments, determining appropriate responses to a vehicle operator impairment may include accessing information about a vehicle operator 106, such as past reactions to responses to impairments or a user profile for the vehicle operator 106. This information may be obtained from previous interaction with the system 100 or from other sources, including third-party vendors or social media. This information regarding the vehicle operator 106 may be used to predict the reaction of the vehicle operator 106 to potential responses, which may be used to determine the most effective response in block 312. In some embodiments, this information may be stored in a user profile, which may be initially generated during a training period prior to implementation of the vehicle operator impairment detection and mitigation method 300. Such user profile may be stored on the mobile device 110, on-board computer 114, or server 140.

In one embodiment, the method above may be adapted to determine whether a vehicle operator 106 is unimpaired and capable of receiving control of the vehicle 108 following a period of automatic control. This may be of particular use when navigational control of the vehicle 108 has been fully automated for a period of time, such as during long-distance travel along a highway. Before exiting fully automated control, the automated control system may require a determination by system 100 that the vehicle operator 106 is unimpaired and prepared to regain control of the vehicle 108. If no impairment is determined to exist at block 310, control of the vehicle 108 may be returned to the vehicle operator 106. If an impairment is determined to exist at block 310, the system 100 may determine an appropriate response at block 312. The response may consist of alerting the vehicle operator 106, mitigating the impairment in any manner discussed above, continuing automated control of the vehicle 108, or automatically stopping the vehicle 108 (e.g., pulling out of traffic onto an available roadway shoulder, etc.).

Once an appropriate response has been determined in block 312, the vehicle operator impairment detection and mitigation method 300 causes the response to be implemented in block 314. Depending upon the response determined in block 312, the mobile device 110, on-board computer 114, or server 140 may cause the presentation of an alert, a stimulus, or a recommendation to the vehicle operator 106 using the speakers 122 or 246, the display 202, or another presentation device in the vehicle 108. Where other responses so require, the mobile device 110, on-board computer 114, or server 140 may cause adjustments to vehicle environmental systems (e.g., ventilation, lighting, temperature, etc.). To implement the responses of delaying or grouping the presentation of incoming communications or other distracting information, the mobile device 110, on-board computer 114, or server 140 may interact with one or more of the software applications 230 or software routines 234 to temporarily limit presentation of some or all communications or notifications. During or following the implementation of the determined response at block 314, the method 300 may continue to collect sensor data regarding the vehicle operator 106, the vehicle 108, and the environment of the vehicle 108 at block 306. Where a response involves the presentation of text (e.g., an alert, recommendation, e-mail, SMS text message, news story, status update through a social networking service, etc.), such text may be presented as a computer-generated spoken version of the text.

The system 100 may continue to implement the determined response until the sensor data indicate the vehicle operator 106 is no longer impaired. Additionally, the response may continue until a time-out threshold (e.g., 5 minutes, 10 minutes, etc.) has been reached or until disabled by the vehicle operator 106. Where the vehicle operator 106 may disable the stimuli by providing a shut-off command, such shut-off command may include the following: depressing a button of the mobile device 110 or on-board computer 114, touching a display 202 or other input device (not shown), making a gesture observable by the front image capture device 218, speaking a command observable by a microphone (not shown) of the mobile device 110 or on-board computer 114, stopping the vehicle 108, terminating the client application 232, etc.

The vehicle operator impairment detection and mitigation system 100 may continue to gather and analyze data while a particular trip is ongoing (block 316). The trip may become completed by a user command (e.g., the user selects a "Stop" button on the mobile device 110 or on-board computer 114) or automatically (e.g., the on-board computer 114 detects that the engine of the vehicle 108 has stopped). When the trip is complete, the vehicle operator impairment detection and mitigation system 100 may analyze the data collected during the just completed trip along with data from previous trips to provide metrics and suggestions to the user. For example, the vehicle operator impairment detection and mitigation system 100 may analyze thirty trips over the course of two weeks and determine that the vehicle operator 106 tends to be most impaired around the hours of 12 P.M. and 6 P.M. Accordingly, the vehicle operator impairment detection and mitigation system 100 may recommend that the user avoid vehicle operation around the hours of 12 P.M. and 6 P.M. or take other ameliorative actions (e.g., drinking a caffeinated beverage shortly before operating the vehicle at high impairment times, removing distractions by turning off the stereo at high impairment times, etc.).

FIGS. 7-13 depict client application pages or screens that may be displayed on the display 202 of the mobile device 110 as part of the user interface used to implement the vehicle operator impairment monitoring system 100. While FIGS. 7-13 depict client application pages or screens being displayed on the display 202 of the mobile device 110, it will be understood that the client application pages or screens could be displayed on additional displays, including displays 202 of the on-board computer 114. The client applications or pages may be generated by the mobile device 110 or on-board computer 114, or they may be sent to the mobile device 110 by the server 140 (e.g., as with a thin client device). The user may launch the client application 232 from the mobile device 110 or on-board computer 114 via any suitable manner, such as touch-selecting a client application icon (not shown) on the display 202 or speaking a voice command into a microphone (not shown). After the user launches the client application 232, the client application 232 may begin to run on the mobile device 110 or on-board computer 114 as described above in connection with block 302 of FIG. 3.

Figure 7:
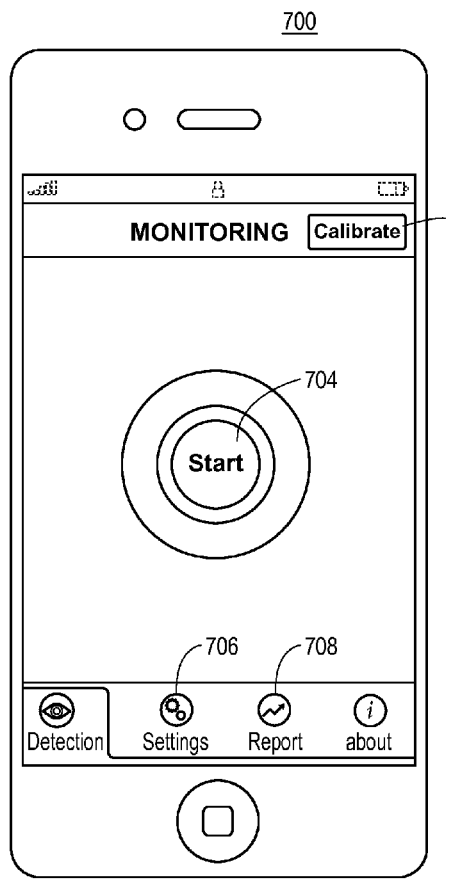
FIGS. 7-13 depict embodiments of user interface screens associated with a client application for implementing the vehicle operator impairment detection and mitigation system in accordance with the presently described embodiments.

With reference now to FIG. 7, a home screen 700 of the client application 232 may be displayed on the display 202 of the mobile device 110. The home screen 700 may include a "Calibrate" button 702, a "Start" button 704, a "Settings" tab 706, and a "Report" tab 708. When the user selects the calibrate button 702 the client application 232 may execute a calibration routine at described above in connection with block 304.

Figure 8:
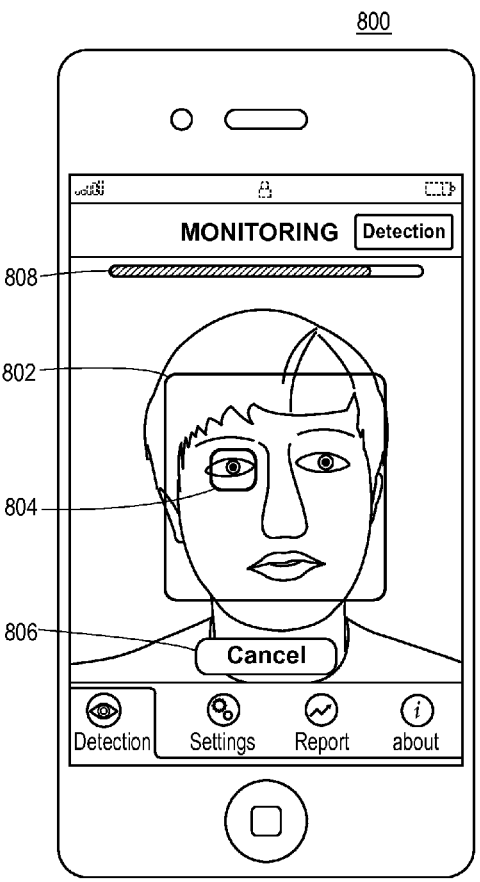

With reference now to FIG. 8, a calibration screen 800 of the client application 232 may be displayed on the display 202 of the mobile device 110 during a calibration routine executed in connection with block 304. The calibration screen 800 may include a face detection indicator 802, an eye detection indicator 804, a "Cancel" button 806, and a calibration progress indicator 808. While the client application 232 is executing the calibration routine discussed in connection with block 304, the calibration screen 800 may display a face detection indicator 802 showing on the display 202 the visual area perceived by the client application 232 to be the face of the user 106 or an eye detection indicator 804 showing on the display the visual area perceived by the client application 232 to be an eye of the user 106. If a user selects the cancel button 806, calibration may be terminated. A calibration progress indicator 808 may display an approximate indication of the status of the calibration routine.

Figure 9:
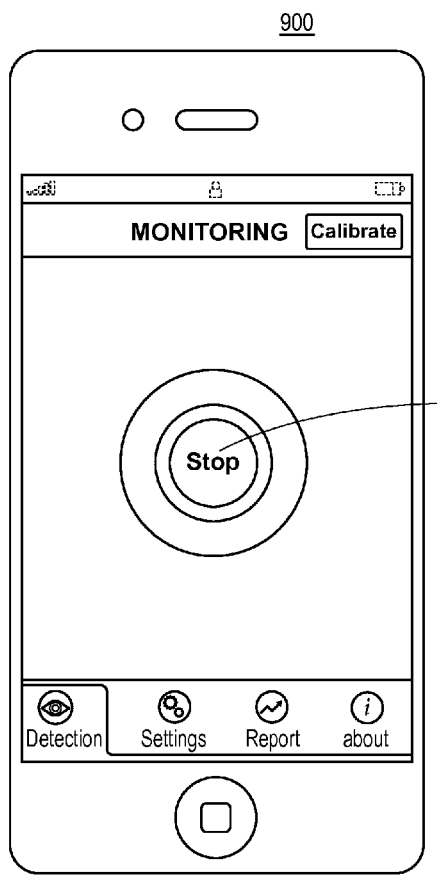

Referring again to FIG. 7 when the user selects the "Start" button 704, the client application 232 may begin to collect sensor data about the vehicle operator 106, the vehicle 108, and the external environment of the vehicle 108. The client application 232 may then analyze the data, and present appropriate responses when the vehicle operator is determined to be impaired until the trip is complete (blocks 306-316). With reference now to FIG. 9, vehicle operator monitoring screen 900 may be displayed on the display 202 of the mobile device 110 executed in connection with blocks 306-316. The vehicle operator monitoring screen 900 may include a "Stop" button 902. If the "Stop" button 902 is selected by the user, the vehicle operator impairment detection and mitigation system 100 may terminate vehicle operator monitoring. Selecting the "Stop" button 902 may also permit the user to save additional information about the trip as well as launch a save trip screen 1100 as shown in FIG. 11.

Figure 10:
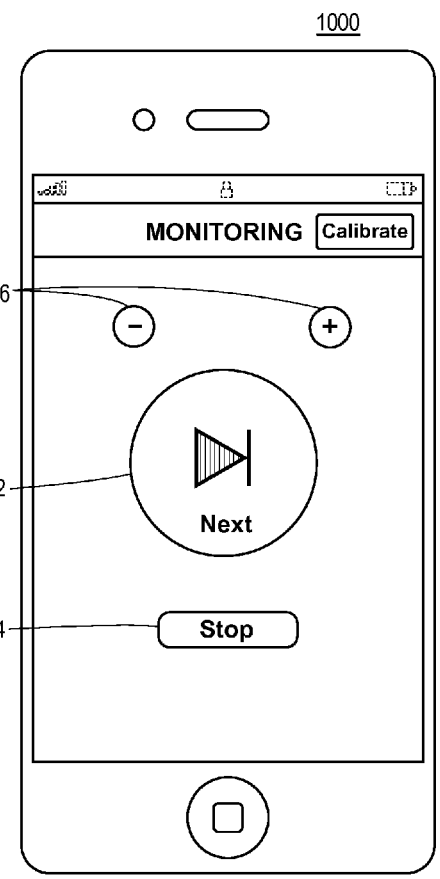

FIG. 10 illustrates an alternative vehicle operator monitoring screen 1000 of the client application 232 that may be displayed, in certain instances, on the display 202 of the mobile device 110 in connection with block 314. When the appropriate response determined at block 312 consists of the presentation of music or other sound recording, the alternative vehicle operator monitoring screen 1000 may be displayed while the system 100 presents the selected stimulus. The alternative vehicle operator monitoring screen 1000 may include a "Next" button 1002, a "Stop" button 1004, and rating buttons 1006. If the "Next" button 1002 is selected by the user, the stimulus may be terminated, another musical selection or sound recording may be determined at block 312, and the new music or sound recording may be presented to the vehicle operator 106. If the "Stop" button 1004 is selected by the user, the method 300 may determine another type of response that does not include the presentation of music or other sound recordings at block 312 and implement the alternative response at block 314. The vehicle operator 106 may also use the rating buttons 1006 to indicate satisfaction or dissatisfaction with the presented stimulus. The information regarding vehicle operator preferences may be stored in a user profile or otherwise stored on the mobile device 110, on-board computer 114, or server 140 in a form that may be accessed and used in determining appropriate responses to future impairments in block 312.

Figures 11, 12:
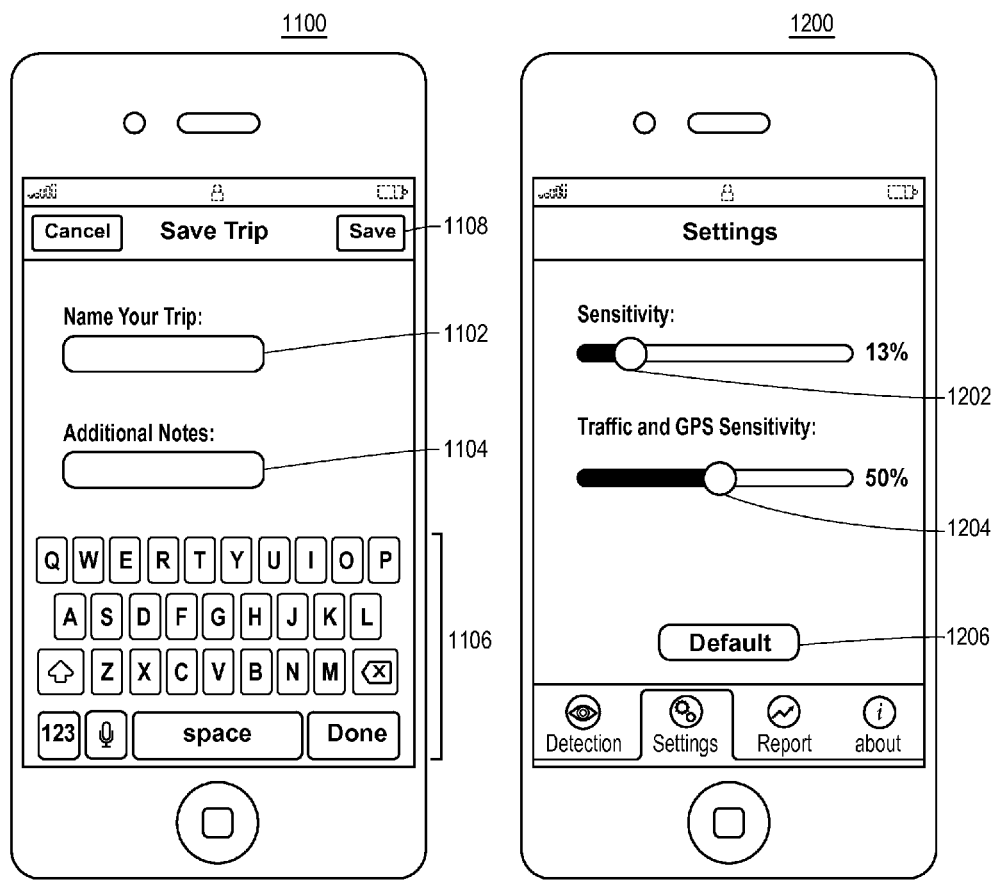

With reference now to FIG. 11, a save trip screen 1100 of the client application 232 may be displayed on the display 202 of the mobile device 110 used in connection with block 318. The save trip screen 1100 may include a trip name entry field 1102, an additional notes entry field 1104, an on-screen keyboard 1106, and a "Save" button 1108. A user may input a name of the trip into the trip name entry field 1102 or the additional notes entry field 1104 using the on-screen keyboard at 1106, a physical keyboard (not shown), or microphone (not shown). Selecting the "Save" button 1108 may cause the data from the trip (e.g., sensor data, individual impairment indicators scores, total impairment scores, etc.) to be saved in data storage 228 or to be transmitted to the server 140 for remote storage in the system database 146.

Referring again to FIG. 7 when the user selects the settings tab 706, a settings screen 1200 may be displayed on the display 202 of the mobile device 110 as shown in FIG. 12. The settings screen 1200 may include a sensitivity adjustment control 1202, a traffic and GPS sensitivity adjustment control 1204, a message grouping control 1206, and a "Default" button 1208. Adjusting the sensitivity adjustment control 1202 (e.g., by sliding a virtual slider) may increase or decrease the sensitivity setting of the vehicle operator impairment detection and mitigation system 100 as discussed above. Similarly, adjusting the traffic and GPS sensitivity adjustment control 1204 may increase or decrease the weight given to data regarding traffic conditions and vehicle location as accessed via network 130, relative to the weight given to data from the sensors. The message grouping control 1206 may allow the vehicle operator 106 to decide whether to permit the vehicle operator impairment monitoring system 100 to delay presentation of incoming communications or other notifications to prevent or limit vehicle operator impairment as discussed above. The "Default" button 1208 may be used to set the sensitivity adjustment control 1202 and traffic and GPS sensitivity adjustment control 1204 back to their default settings.

Figure 13:
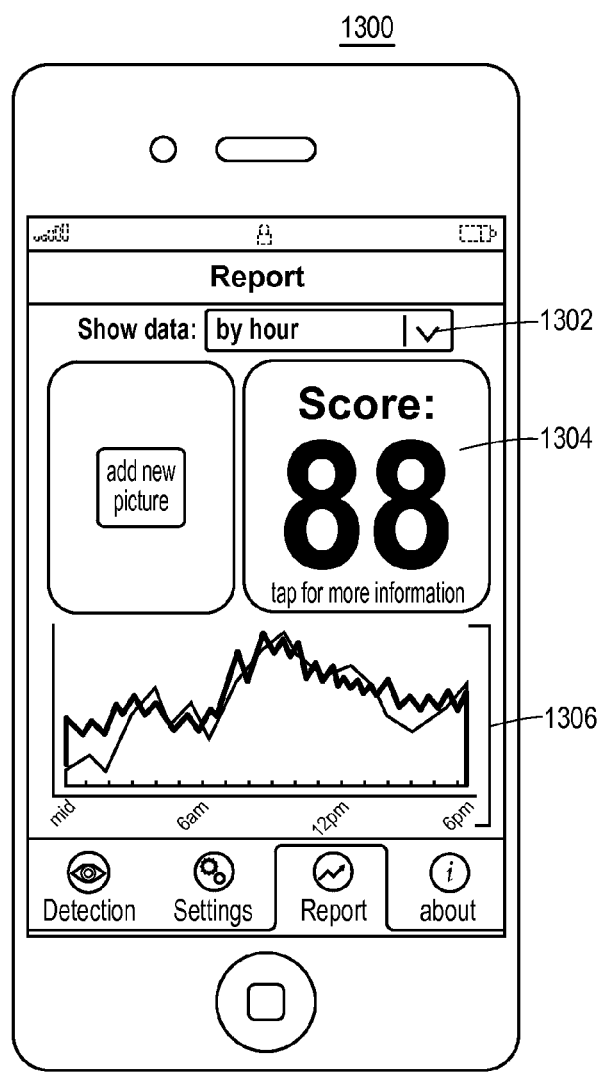

Referring again to FIG. 7, when the user selects the report tab 708, a report screen 1300 may be displayed on the display 202 of the mobile device 110 as shown in FIG. 13 used in connection with block 318. The report screen 1300 may include a data range adjustment control 1302, an average total impairment score 1304, and a graph of time versus one or more total impairment scores 1306. The data range adjustment control 1302 may be used to change the time axis (i.e., the X-axis) of the graph of time versus total impairment scores 1306 (e.g., show data by hour, by day, by month, by year, etc.). The average total impairment score 1304 may display the average of one or more total impairment scores of the most recently completed trip or an average of all of the trips for which the vehicle operator impairment monitoring system 100 has data.

Figure 14:
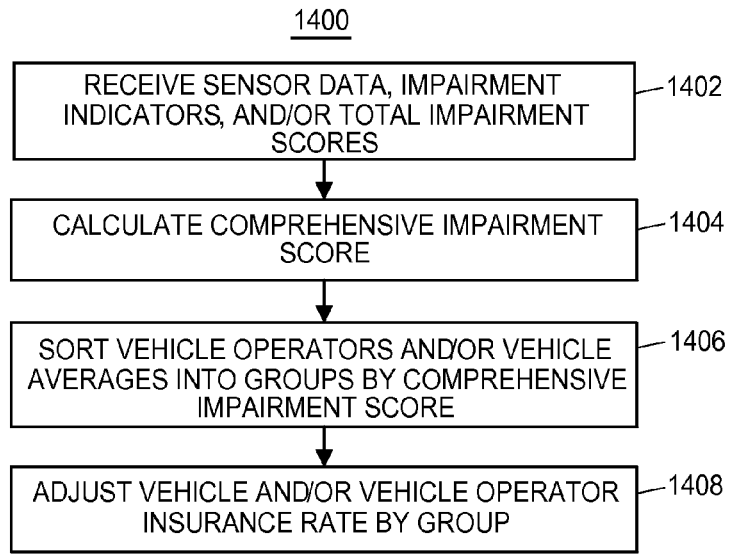
FIG. 14 depicts an insurance rate adjustment method for implementing the vehicle operator impairment detection and mitigation system and method in accordance with the presently described embodiments.

FIG. 14 is a flow diagram depicting an exemplary embodiment of an insurance rate adjustment method 1400 implemented by the vehicle operator impairment detection and mitigation system 100. More particularly the method 1400 may be performed by the server 140. The server 140 may receive some or all of the sensor data collected or generated by the mobile device 110, onboard computer 114, or physiological sensor 120 over the network 130 (block 1502). The sensor data may include physiological sensor data regarding the vehicle operator 106, as well as other sensor data regarding vehicle operation patterns and behavior (e.g., accelerometer data, proximity sensor data, GPS data, etc.) that may bear upon the risk of injury or property damage. The server 140 may also receive some or all of the individual impairment indicators and total impairment scores discussed above with respect to FIGS. 4-6. The server 140 may then determine one or more impairment scores based on the data received at block 1402 (block 1404). For example, the server 140 may determine a comprehensive impairment score representing a summary of the level of impairment of the vehicle operator 106 over a period of time, such as a month or a year. Alternatively, the comprehensive impairment score may represent a summary of the risk of injury and damage associated with the observed impairment levels and behavior of the vehicle operator 106 or the expected loss from such risk level.

Once a comprehensive impairment score has been calculated as discussed below, the comprehensive impairment score may be used to assign the insurance policy of the vehicle operator 106 to a comprehensive impairment level group with the policies of other vehicle operators with similar comprehensive impairment scores. The comprehensive impairment level groups may be set to follow a normal distribution; however, the comprehensive impairment level groups may also be set to follow any other known distribution or follow a different methodology. There may be any number of comprehensive impairment level groups (e.g., ten comprehensive impairment level groups), and the groups may or may not be evenly distributed along the normal curve. Each of the groups may be assigned an insurance policy rate increase or decrease amount (e.g., a fixed amount or percentage increase or decrease) or some other adjustment. For example, if there are ten comprehensive impairment level groups where Comprehensive Impairment Level Group 1 includes policies of vehicle operators associated that have the highest comprehensive impairment scores (indicating a high level of impairment) and Comprehensive Impairment Group 10 includes policies that have the lowest comprehensive impairment scores, then policies grouped in Comprehensive Impairment Level Groups 1-3 may be associated with an insurance rate increase (e.g., $300, $200, and $100, respectively), Comprehensive Impairment Level Groups 4-6 may not be associated with an increase or decrease, and Comprehensive Impairment Level Groups 7-10 may be associated with an insurance rate decrease (e.g., -$100, -$200, and -$300, respectively). This information on insurance rate adjustments based upon calculated risk related to vehicle operator emotional state may be conveyed to customers or prospective customers, providing an incentive for emotional state management and a disincentive for risky vehicle operation behavior.

Further, it may be advantageous to identify policies with particularly high levels of comprehensive impairment for cancellation of the insurance policy. In some embodiments, the policies grouped in the most impaired groups may not be charged an increased rate. In such embodiments, the prospect of a discount without the risk of an insurance rate increase may be used to entice a vehicle operator 106 to use the vehicle operator impairment monitoring system 100. Once the insurance policy of the vehicle operator 106 has been assigned into the appropriate group, the decrease or increase that may be associated with the group may be applied to the policy of the vehicle operator 106 (block 1408). More than one vehicle operator 106 may be on the same policy (e.g., a married couple, a family with children on the policy, etc.). If more than one vehicle operator 106 is on the same policy, the vehicle operator impairment detection and mitigation system 100 may be used to adjust the rate for the entire policy based on the comprehensive impairment scores of the various vehicle operators 106, such as by aggregating or averaging the comprehensive impairment scores of the multiple vehicle operators. Averaging the comprehensive impairment scores of the multiple vehicle operators may include weighting the scores of each vehicle operator based upon the time or distance traveled by each vehicle operator.

Alternatively, or additionally, the comprehensive impairment score may be used to determine an amount of an insurance rate increase or decrease for a policy associated with the vehicle operator 106. The comprehensive impairment score may be used alone or in combination with other available information regarding the vehicle operator to estimate a risk level associated with the vehicle operator 106. The risk level determination may be used to adjust rates according to any mathematical, statistical, or actuarial model or may be used to limit insurance policy coverage under certain conditions. For example, certain minimal levels of insurance coverage may be required based on the risk determination, or, conversely, certain limitations may be set on the maximum level of insurance coverage available for losses due to certain causes. Insurance rates may also be quoted to a customer or prospective customer in a manner dependent upon future measurements of vehicle operator impairment. This may be particularly valuable for short-term policies, such as those associated with short-term vehicle rentals, or in other circumstances where a record of past impairment may be unavailable.

Figure 15:
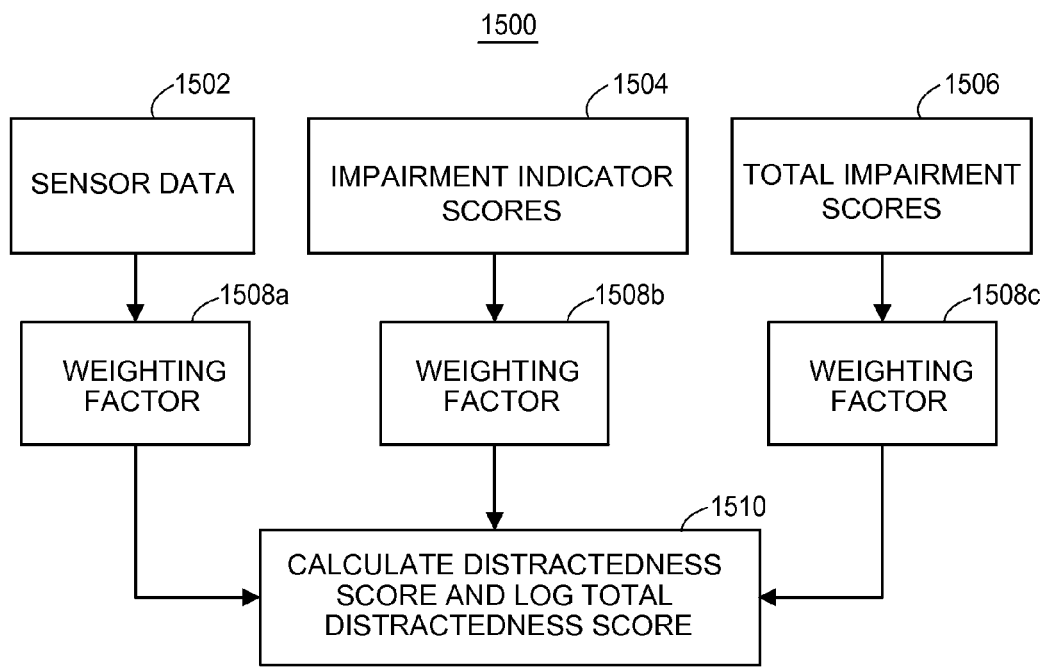
FIG. 15 depicts an exemplary comprehensive impairment score determination method for implementing the vehicle operator impairment detection and mitigation system and method in accordance with the presently described embodiments.

FIG. 15 is a flow diagram depicting an exemplary embodiment of a comprehensive impairment score determination method 1500 implemented by the vehicle operator impairment detection and mitigation system 100 while determining a comprehensive impairment score for the vehicle operator 106 at block 1404. The method 1500 may receive sensor data from the mobile device 110 or onboard computer 114 (block 1502), individual impairment indicators from the mobile device 110 or onboard computer 114 (block 1504), or total impairment scores calculated by the mobile device 110 or onboard computer 114 (block 1506). The method 1500 may also receive additional sensor data or telematic information regarding the operation of the vehicle 108. If the method 1500 receives sensor data, the server 140 may generate each impairment indicator score and total impairment score in a manner similar to how the mobile device 110 or onboard computer 114 calculates the scores as discussed above with respect to FIGS. 4-6. For example, the server 140 may determine a GSR score using GSR sensor data transmitted via network 130. Because the memory and computing power of the server 140 may be greater than the mobile device or onboard computer 114, it may be advantageous to calculate the various scores using a longer period of time (e.g., an average hard braking score over one week rather than over a number of minutes). Sensor data may also be directly used by the comprehensive impairment score determination method, in which case it may be normalized to an appropriate scale (e.g., 0-100 points, etc.) by any of the various known adjustment methods. The server 140 may also receive individual impairment indicator scores or total impairment scores from the mobile device 110 or onboard computer 114. In a manner similar to FIGS. 4-6, the method 1500 may determine a comprehensive impairment score by multiplying each score by a weighting factor 1508*a, b*, and *c*. Each score may be weighted equally, or it may be advantageous to weight the scores differently. The method 1500 may then sum the weighted scores to determine a comprehensive impairment score (block 1510). The comprehensive impairment score may be logged with a timestamp and stored in the system database 246.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for determining the status of a vehicle operator, comprising: receiving, by one or more processors, sensor data from one or more sensors regarding at least three of the following: alertness of the vehicle operator, distractedness of the vehicle operator, emotional state of the vehicle operator, vehicle operator workload, traffic conditions, environmental conditions, or the movement of a vehicle; determining, by one or more processors, whether the vehicle operator is impaired based on the received sensor data regarding at least one of the following: alertness of the vehicle operator, distractedness of the vehicle operator, emotional state of the vehicle operator, vehicle operator workload, traffic conditions, environmental conditions, or the movement of a vehicle; when it is determined that the vehicle operator is impaired, determining, by one or more processors, one or more responses to alert the vehicle operator of the impairment or mitigate the impairment; and causing the one or more responses to be implemented.

2. The method according to aspect 1, wherein one or more of the received sensor data comprises one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

3. The method according to either aspect 1 or aspect 2, wherein one or more of the received sensor data comprises sensor data regarding one or more of the following: a vehicle operator head nod, a vehicle operator scanning frequency, a vehicle operator gaze fixation, a vehicle operator mirror checking, a vehicle operator head rotation, a vehicle operator arm movement, a vehicle lane deviation, a vehicle swerving, a vehicle lane centering, a vehicle acceleration along a single axis or multiple axes, a vehicle distance to other objects, or a measure of vehicle time to collision with other objects.

4. The method according to any one of the preceding aspects, by one or more processors, data transmitted through a network regarding one or more of the following: a position of the vehicle, movement of the vehicle, an external environment around the vehicle, or traffic conditions.

5. The method according to any one of the preceding aspects, wherein: receiving, by one or more processors, the sensor data further comprises receiving the sensor data by one or more mobile devices or one or more on-board computers within the vehicle; determining, by one or more processors, whether the vehicle operator is impaired further comprises determining whether the vehicle operator is impaired using the one or more mobile devices or the one or more on-board computers within the vehicle; and determining, by one or more processors, the one or more responses further comprises determining the one or more responses using the one or more mobile devices or the one or more on-board computers within the vehicle.

6. The method according to any one of the preceding aspects, wherein determining, by one or more processors, whether the vehicle operator is impaired based on the received sensor data further comprises: calculating, by one or more processors, a plurality of impairment scores based on the received sensor data; calculating, by one or more processors, one or more total impairment scores from one or more of the plurality of impairment scores; and determining, by one or more processors, whether one or more of the total impairment scores fails to reach a minimum threshold value or exceeds a maximum threshold value.

7. The method according to any one of the preceding aspects, wherein: determining, by one or more processors, whether the vehicle operator is impaired based on the received sensor data further comprises transmitting the sensor data, the impairment scores, or the total impairment scores to one or more servers through a network and determining with the one or more servers whether the vehicle operator is impaired; and determining, by one or more processors, one or more responses to alert the vehicle operator of the impairment or mitigate the impairment further comprises determining with the one or more servers the one or more responses to alert the vehicle operator of the impairment or mitigate the impairment.

8. The method according to any one of the preceding aspects, further comprising comparing the total impairment scores with total impairment scores of other vehicle operators to adjust a risk level used in rating and underwriting an insurance policy of the vehicle operator.

9. The method according to any one of the preceding aspects, wherein: determining, by one or more processors, whether the vehicle operator is impaired based on the received sensor data further comprises predicting, by one or more processors, whether presenting information to the vehicle operator would cause the vehicle operator to become impaired based on the received sensor data; and determining, by one or more processors, one or more responses to alert the vehicle operator of the impairment or mitigate the impairment further comprises determining, by one or more processors, to delay presenting information to the vehicle operator until a time when presenting information to the vehicle operator would not cause the vehicle operator to become impaired.

10. The method according to any one of the preceding aspects, further comprising, when it is determined that the vehicle operator is not impaired, determining, by one or more processors, a response to terminate automated vehicle operation and return control of the vehicle to the vehicle operator.

11. A computer system for determining the status of a vehicle operator, comprising: one or more processors; one or more sensors; and a program memory coupled to the one or more processors and storing executable instructions that when executed by the one or more processors cause the computer system to: receive sensor data from the one or more sensors regarding at least three of the following: alertness of the vehicle operator, distractedness of the vehicle operator, emotional state of the vehicle operator, vehicle operator workload, traffic conditions, environmental conditions, or the movement of a vehicle; determine whether the vehicle operator is impaired based on the received sensor data regarding at least one of the following: alertness of the vehicle operator, distractedness of the vehicle operator, emotional state of the vehicle operator, vehicle operator workload, traffic conditions, environmental conditions, or the movement of a vehicle; when it is determined that the vehicle operator is impaired, determine one or more responses to alert the vehicle operator of the impairment or mitigate the impairment; and cause the one or more responses to be implemented.

12. The computer system according to aspect 11, wherein one or more of the sensors are configured to measure one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

13. The computer system according to either aspect 11 or aspect 12, wherein one or more of the sensors are configured to measure sensor data regarding one or more of the following: a vehicle operator head nod, a vehicle operator scanning frequency, a vehicle operator gaze fixation, a vehicle operator mirror checking, a vehicle operator head rotation, a vehicle operator arm movement, a vehicle lane deviation, a vehicle swerving, a vehicle lane centering, a vehicle acceleration along a single axis or multiple axes, a vehicle distance to other objects, or a measure of vehicle time to collision with other objects.

14. The computer system according to any one of aspects 11-13, wherein the one or more processors are configured within a mobile device or an on-board computer.

15. The computer system according to any one of aspects 11-14, wherein the executable instructions that when executed by the processor cause the computer system to determine whether the vehicle operator is impaired based on the received sensor data further cause the computer system to: calculate a plurality of impairment scores using the sensor data; calculate one or more total impairment scores from one or more of the plurality of impairment scores; and determine whether one or more of the total impairment scores fails to reach a minimum threshold value or exceeds a maximum threshold value.

16. The computer system according to any one of aspects 11-15, further comprising one or more servers connected through a network and wherein the one or more servers are configured to receive the sensor data or information derived therefrom, determine whether the vehicle operator is impaired based on the received sensor data, and determine one or more responses to alert the vehicle operator of the impairment or mitigate the impairment when it is determined that the vehicle operator is impaired.

17. The computer system according to any one of aspects 11-16, wherein at least one of the one or more servers are further configured to compare the total impairment scores with total impairment scores of other vehicle operators and to adjust a risk level used in rating and underwriting an insurance policy of the vehicle operator.

18. A tangible, non-transitory computer-readable medium storing instructions for determining the status of a vehicle operator that when executed by one or more processors of a computer system cause the computer system to: receive sensor data from the one or more sensors regarding at least three of the following: alertness of the vehicle operator, distractedness of the vehicle operator, emotional state of the vehicle operator, vehicle operator workload, traffic conditions, environmental conditions, or the movement of a vehicle; determine whether the vehicle operator is impaired based on the received sensor data regarding at least one of the following: alertness of the vehicle operator, distractedness of the vehicle operator, emotional state of the vehicle operator, vehicle operator workload, traffic conditions, environmental conditions, or the movement of a vehicle; when it is determined that the vehicle operator is impaired, determine one or more responses to alert the vehicle operator of the impairment or mitigate the impairment; and cause the one or more responses to be implemented.

19. The tangible, non-transitory computer-readable medium according to aspect 18, wherein one or more of the received sensor data comprises one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

20. The tangible, non-transitory computer-readable medium according to either aspect 18 or aspect 19, wherein one or more of the received sensor data comprises sensor data regarding one or more of the following: a vehicle operator head nod, a vehicle operator scanning frequency, a vehicle operator gaze fixation, a vehicle operator mirror checking, a vehicle operator head rotation, a vehicle operator arm movement, a vehicle lane deviation, a vehicle swerving, a vehicle lane centering, a vehicle acceleration along a single axis or multiple axes, a vehicle distance to other objects, or a measure of vehicle time to collision with other objects.

21. The tangible, non-transitory computer-readable medium according to any one of aspects 18-20, wherein the executable instructions that when executed by the one or more processors cause the computer system to determine whether the vehicle operator is impaired based on the received sensor data further comprise executable instructions that when executed by the one or more processors cause the computer system to: calculate a plurality of impairment scores using the sensor data; calculate one or more total impairment scores from one or more of the plurality of impairment scores; and determine whether one or more of the total impairment scores fails to reach a minimum threshold value or exceeds a maximum threshold value.

22. The tangible, non-transitory computer-readable medium according to any one of aspects 18-21, further comprising executable instruction that when executed by the one or more processors cause the computer system to transmit the sensor data, impairment scores, or total impairment scores to a server through a network.

What is claimed is:

1. A computer-implemented method for monitoring a vehicle operator during operation of a vehicle, comprising:
    (i) during a training period:
        receiving, at one or more processors, first sensor data from one or more sensors regarding at least one of the following: alertness of the vehicle operator, distractedness of the vehicle operator, emotional state of the vehicle operator, traffic conditions, environmental conditions, or the movement of the vehicle;
        determining, by one or more processors, that at least one response from a plurality of potential responses should be implemented based upon the received first sensor data;
        selecting, by one or more processors, a first response from the plurality of potential responses;
        causing the first response to be implemented;
        receiving, at one or more processors, second sensor data from the one or more sensors following the commencement of implementation of the first response; and
        recording in a user profile associated with the vehicle operator an indication of an effect of the first response on the vehicle operator, wherein the indication of the effect of the first response is based at least in part upon a reaction of the vehicle operator to the first response based upon the received second sensor data, and wherein recording in the user profile the indication of the effect of the first response on the vehicle operator includes generating the user profile based upon the received first and second sensor data; and
    (ii) during a monitoring period following the training period:
        receiving, at one or more processors, third sensor data from the one or more sensors regarding at least one of the following: alertness of the vehicle operator, distractedness of the vehicle operator, emotional state of the vehicle operator, traffic conditions, environmental conditions, or the movement of the vehicle;
        determining, by one or more processors, the vehicle operator is impaired, based upon the received third sensor data, with respect to at least one of the following vehicle operator states: alertness of the vehicle operator, distractedness of the vehicle operator, anxiety of the vehicle operator, agitation of the vehicle operator, aggression of the vehicle operator, or health of the vehicle operator;
        selecting, by one or more processors, a second response from the plurality of potential responses based upon the third sensor data and the user profile by:
            determining two or more predicted reactions of the vehicle operator to two or more of the plurality of potential responses based upon the third sensor data and the user profile;
            comparing the two or more predicted reactions of the vehicle operator to determine the most effective response from the two or more of the plurality of potential responses; and
            selecting the most effective response from the two or more of the plurality of potential responses; and
        causing the second response to be implemented.

2. The computer-implemented method of claim 1, wherein recording in the user profile the indication of the effect of the first response on the vehicle operator includes recording an operator reaction to the first response.

3. The computer-implemented method of claim 1, wherein:
    the first response includes one or more stimuli to be presented to the vehicle operator, and
    the indication of the effect of the first response on the vehicle operator includes information regarding one or more reactions of the vehicle operator to the one or more stimuli.

4. The computer-implemented method of claim 1, wherein recording in the user profile the indication of the effect of the first response on the vehicle operator further includes:
    calculating a plurality of impairment scores based upon the received first sensor data,
    calculating a corresponding plurality of impairment scores based upon the received second sensor data, and recording an indication of the change between the plurality of impairment scores based upon the received first sensor data and the corresponding plurality of impairment scores based upon the received second sensor data.

5. The computer-implemented method of claim 4, further comprising:
calculating, by one or more processors, one or more total impairment scores from the plurality of impairment scores based upon the received first sensor data or the corresponding plurality of impairment scores based upon the received second sensor data, and
comparing, by one or more processors, the one or more total impairment scores with total impairment scores of other vehicle operators to adjust a risk level used in rating and underwriting an insurance policy of the vehicle operator.

6. The computer-implemented method of claim 1, wherein:
the received second sensor data includes one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

7. A computer system for monitoring a vehicle operator during operation of a vehicle, comprising:
one or more processors;
one or more sensors; and
a program memory coupled to the one or more processors and storing executable instructions that, when executed by the one or more processors, cause the computer system to:
(i) during a training period:
receive first sensor data from one or more sensors regarding at least one of the following: alertness of the vehicle operator, distractedness of the vehicle operator, emotional state of the vehicle operator, traffic conditions, environmental conditions, or the movement of the vehicle;
determine that at least one response from a plurality of potential responses should be implemented based upon the received first sensor data;
select a first response from the plurality of potential responses;
cause the first response to be implemented;
receive second sensor data from the one or more sensors following the commencement of implementation of the first response; and
record in a user profile associated with the vehicle operator an indication of an effect of the first response on the vehicle operator, wherein the indication of the effect of the first response is based at least in part upon a reaction of the vehicle operator to the first response based upon the received second sensor data, and wherein recording in the user profile the indication of the effect of the first response on the vehicle operator includes generating the user profile based upon the received first and second sensor data; and
(ii) during a monitoring period following the training period:
receive third sensor data from the one or more sensors regarding at least one of the following: alertness of the vehicle operator, distractedness of the vehicle operator, emotional state of the vehicle operator, traffic conditions, environmental conditions, or the movement of the vehicle;
determine the vehicle operator is impaired, based upon the received third sensor data, with respect to at least one of the following vehicle operator states: alertness of the vehicle operator, distractedness of the vehicle operator, anxiety of the vehicle operator, agitation of the vehicle operator, aggression of the vehicle operator, or health of the vehicle operator;
select a second response from the plurality of potential responses based upon the third sensor data and the user profile by:
determining two or more predicted reactions of the vehicle operator to two or more of the plurality of potential responses based upon the third sensor data and the user profile;
comparing the two or more predicted reactions of the vehicle operator to determine the most effective response from the two or more of the plurality of potential responses; and
selecting the most effective response from the two or more of the plurality of potential responses; and
causing the second response to be implemented.

8. The computer system of claim 7, wherein recording in the user profile the indication of the effect of the first response on the vehicle operator includes recording an operator reaction to the first response.

9. The computer system of claim 7, wherein:
the first response includes one or more stimuli to be presented to the vehicle operator, and
the indication of the effect of the first response on the vehicle operator includes information regarding one or more reactions of the vehicle operator to the one or more stimuli.

10. The computer system of claim 7, wherein the executable instructions that cause the computer system to record in the user profile the indication of the effect of the first response on the vehicle operator further cause the computer system to:
calculate a plurality of impairment scores based upon the received first sensor data,
calculate a corresponding plurality of impairment scores based upon the received second sensor data, and
record an indication of the change between the plurality of impairment scores based upon the received first sensor data and the corresponding plurality of impairment scores based upon the received second sensor data.

11. The computer system of claim 10, wherein the program memory further stores executable instructions that, when executed by the computer system, cause the computer system to:
calculate one or more total impairment scores from the plurality of impairment scores based upon the received first sensor data or the corresponding plurality of impairment scores based upon the received second sensor data, and compare the one or more total impairment scores with total impairment scores of other vehicle operators to adjust a risk level used in rating and underwriting an insurance policy of the vehicle operator.

12. The computer system of claim 7, wherein:
the received second sensor data includes one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

13. A tangible, non-transitory computer-readable medium storing instructions for monitoring a vehicle operator during operation of a vehicle that, when executed by one or more processors of a computer system, cause the computer system to:
(i) during a training period:
receive first sensor data from one or more sensors regarding at least one of the following: alertness of the vehicle operator, distractedness of the vehicle operator, emotional state of the vehicle operator, traffic conditions, environmental conditions, or the movement of the vehicle;
determine that at least one response from a plurality of potential responses should be implemented based upon the received first sensor data;
select a first response from the plurality of potential responses;
cause the first response to be implemented;
receive second sensor data from the one or more sensors following the commencement of implementation of the first response; and
record in a user profile associated with the vehicle operator an indication of an effect of the first response on the vehicle operator, wherein the indication of the effect of the first response is based at least in part upon a reaction of the vehicle operator to the first response based upon the received second sensor data, and wherein recording in the user profile the indication of the effect of the first response on the vehicle operator includes generating the user profile based upon the received first and second sensor data; and
(ii) during a monitoring period following the training period:
receive third sensor data from the one or more sensors regarding at least one of the following: alertness of the vehicle operator, distractedness of the vehicle operator, emotional state of the vehicle operator, traffic conditions, environmental conditions, or the movement of the vehicle;
determine the vehicle operator is impaired, based upon the received third sensor data, with respect to at least one of the following vehicle operator states: alertness of the vehicle operator, distractedness of the vehicle operator, anxiety of the vehicle operator, agitation of the vehicle operator, aggression of the vehicle operator, or health of the vehicle operator;
select a second response from the plurality of potential responses based upon the third sensor data and the user profile by:
determining two or more predicted reactions of the vehicle operator to two or more of the plurality of potential responses based upon the third sensor data and the user profile;
comparing the two or more predicted reactions of the vehicle operator to determine the most effective response from the two or more of the plurality of potential responses; and
selecting the most effective response from the two or more of the plurality of potential responses; and
causing the second response to be implemented.

14. The tangible, non-transitory computer-readable medium of claim 13, wherein the executable instructions that cause the computer system to record in the user profile the indication of the effect of the first response on the vehicle operator further include executable instructions that cause the computer system to record an operator reaction to the first response.

15. The tangible, non-transitory computer-readable medium of claim 13, wherein:
the first response includes one or more stimuli to be presented to the vehicle operator, and
the indication of the effect of the first response on the vehicle operator includes information regarding one or more reactions of the vehicle operator to the one or more stimuli.

16. The tangible, non-transitory computer-readable medium of claim 13, wherein the executable instructions that cause the computer system to record in the user profile the indication of the effect of the first response on the vehicle operator further cause the computer system to:
calculate a plurality of impairment scores based upon the received first sensor data,
calculate a corresponding plurality of impairment scores based upon the received second sensor data, and
record an indication of the change between the plurality of impairment scores based upon the received first sensor data and the corresponding plurality of impairment scores based upon the received second sensor data.

17. The tangible, non-transitory computer-readable medium of claim 16, further storing executable instructions that, when executed by the one or more processors of the computer system, cause the computer system to: calculate one or more total impairment scores from the plurality of impairment scores based upon the received first sensor data or the corresponding plurality of impairment scores based upon the received second sensor data, and compare the one or more total impairment scores with total impairment scores of other vehicle operators to adjust a risk level used in rating and underwriting an insurance policy of the vehicle operator.

18. The tangible, non-transitory computer-readable medium of claim 13, wherein:
the received second sensor data includes one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

* * * * *